(12) United States Patent
Lee et al.

(10) Patent No.: US 12,204,369 B2
(45) Date of Patent: Jan. 21, 2025

(54) ELECTRONIC DEVICE FOR REDUCING OCCURRENCE OF UNINTENDED USER INPUT AND OPERATION METHOD FOR THE SAME

(71) Applicant: SAMSUNG ELECTRONICS CO., LTD., Suwon-si (KR)

(72) Inventors: Sungjun Lee, Suwon-si (KR); Byoungho Jung, Suwon-si (KR); Sangil Park, Suwon-si (KR); Kwonho Song, Suwon-si (KR); Iljoo Chae, Suwon-si (KR); Kiwon Kim, Suwon-si (KR); Mooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/520,263

(22) Filed: Nov. 27, 2023

(65) Prior Publication Data

US 2024/0094767 A1  Mar. 21, 2024

Related U.S. Application Data

(63) Continuation of application No. 17/366,578, filed on Jul. 2, 2021, now Pat. No. 11,829,200, which is a
(Continued)

(30) Foreign Application Priority Data

Feb. 19, 2019  (KR) .................. 10-2019-0019492

(51) Int. Cl.
*G06F 1/16* (2006.01)
*G06F 3/04883* (2022.01)

(52) U.S. Cl.
CPC .......... *G06F 1/1616* (2013.01); *G06F 1/1643* (2013.01); *G06F 1/1647* (2013.01);
(Continued)

(58) Field of Classification Search
CPC combination set(s) only.
See application file for complete search history.

(56) References Cited

U.S. PATENT DOCUMENTS 8,633,905 B2  1/2014  Harada et al.
9,152,225 B2  10/2015  Park
(Continued)

FOREIGN PATENT DOCUMENTS

| CN | 101937141 | 1/2011 |
| CN | 105765496 | 7/2016 |

(Continued)

OTHER PUBLICATIONS

Communication pursuant to Article 94(3) dated Nov. 14, 2023 in EP Application No. 22 186 543.9.
(Continued)

*Primary Examiner* — Lisa Lea-Edmonds
(74) *Attorney, Agent, or Firm* — Nixon & Vanderhye, P.C.

(57) ABSTRACT

An example electronic device may include a foldable housing, including a hinge, a first housing connected to the hinge and including a first surface facing a first direction and a second surface facing a second direction opposite the first direction, and a second housing connected to the hinge, including a third surface facing a third direction and a fourth surface facing a fourth direction opposite the third direction, the second housing configured to be foldable with respect to the first housing about the hinge, wherein the first surface faces the third surface in a folded state of the electronic device; a display extending from the first surface to the third surface to provide the first surface and the third surface and including a touch controller configured to control a receiving function of an input on the display; a processor disposed inside the first or second housing and operatively coupled to the display; and a memory operatively connected to the
(Continued)

processor, wherein the memory may store instructions that, when executed, cause the processor to control the electronic device to: detect the occurrence of changing an angle between the first housing and the second housing; receive a touch interrupt produced based on an input on the display; identify characteristics of the input in response to detecting the change in the angle; and determine whether to cancel the touch event corresponding to the input based on the characteristics of the input.

19 Claims, 18 Drawing Sheets

Related U.S. Application Data continuation of application No. 16/707,192, filed on Dec. 9, 2019, now Pat. No. 11,054,856.

(52) U.S. Cl.
CPC .......... *G06F 1/1656* (2013.01); *G06F 1/1681* (2013.01); *G06F 3/04883* (2013.01)

(56) References Cited

U.S. PATENT DOCUMENTS

| | | | |
|---|---|---|---|
| 9,170,678 B2* | 10/2015 | Cho | G06F 3/0488 |
| 9,798,359 B2 | 10/2017 | Seo et al. | |
| 9,830,075 B2* | 11/2017 | Kim | G06F 1/1641 |
| 9,891,670 B2* | 2/2018 | Kim | G06F 1/1675 |
| 10,143,098 B1 | 11/2018 | Lee | |
| 10,254,803 B1 | 4/2019 | Quinn | |
| 10,263,982 B2 | 4/2019 | Kim | |
| 10,296,052 B1 | 5/2019 | Quinn | |
| 10,296,053 B1 | 5/2019 | Quinn | |
| 10,296,210 B2 | 5/2019 | Jin et al. | |
| 10,452,106 B2 | 10/2019 | Cho | |
| 10,459,625 B2 | 10/2019 | Seo | |
| 10,503,207 B1 | 12/2019 | Knappert | |
| 10,503,215 B1 | 12/2019 | Quinn | |
| 10,642,485 B1 | 5/2020 | Seo | |
| 10,666,780 B2 | 5/2020 | Cho | |
| 10,678,428 B2 | 6/2020 | Kim | |
| 10,691,177 B2 | 6/2020 | Quinn | |
| 10,712,832 B2 | 7/2020 | Torres | |
| 10,721,348 B2 | 7/2020 | Choi | |
| 10,747,263 B2 | 8/2020 | Aurongzeb | |
| 10,908,738 B2* | 2/2021 | Kim | G06F 1/1677 |
| 11,054,856 B2 | 7/2021 | Lee et al. | |
| 11,449,169 B2* | 9/2022 | Chung | G06F 1/1677 |
| 11,740,654 B2* | 8/2023 | Becze | H04M 1/0216 345/1.3 |
| 11,886,252 B2* | 1/2024 | Kim | G06F 1/1616 |
| 2011/0216064 A1* | 9/2011 | Dahl | H04M 1/0247 345/428 |
| 2012/0050217 A1 | 3/2012 | Noguchi et al. | |
| 2013/0265257 A1 | 10/2013 | Jung et al. | |
| 2014/0035872 A1 | 2/2014 | Park et al. | |
| 2014/0210737 A1 | 7/2014 | Hwang et al. | |
| 2014/0285449 A1 | 9/2014 | Cho | |
| 2015/0212644 A1 | 7/2015 | Noto | |
| 2015/0227166 A1 | 8/2015 | Lee | |
| 2015/0317006 A1 | 11/2015 | Cho et al. | |
| 2015/0378557 A1 | 12/2015 | Jeong | |
| 2016/0026381 A1* | 1/2016 | Kim | G06F 3/04817 715/761 |
| 2016/0085319 A1 | 3/2016 | Kim | |
| 2016/0179236 A1 | 6/2016 | Shin | |
| 2016/0184700 A1* | 6/2016 | Lee | G06F 3/1423 463/31 |
| 2016/0187994 A1* | 6/2016 | La | G06F 3/147 345/619 |
| 2016/0357221 A1 | 12/2016 | Huh | |
| 2017/0045996 A1 | 2/2017 | Ka et al. | |
| 2017/0177034 A1 | 6/2017 | North | |
| 2017/0357292 A1 | 12/2017 | Cho | |
| 2017/0357473 A1* | 12/2017 | Kim | G06F 1/1681 |
| 2018/0039408 A1 | 2/2018 | Cheong et al. | |
| 2018/0039410 A1* | 2/2018 | Kim | G06F 1/1652 |
| 2018/0113520 A1 | 4/2018 | Klein et al. | |
| 2018/0129250 A1 | 5/2018 | La et al. | |
| 2018/0196467 A1 | 7/2018 | Watamura et al. | |
| 2018/0203564 A1 | 7/2018 | Putzolu et al. | |
| 2018/0285061 A1 | 10/2018 | Park et al. | |
| 2019/0012000 A1 | 1/2019 | Cavallaro | |
| 2019/0018454 A1* | 1/2019 | Jung | G06F 1/1652 |
| 2019/0207933 A1 | 7/2019 | Kim | |
| 2019/0278323 A1 | 9/2019 | Aurongzeb | |
| 2020/0218353 A1 | 7/2020 | Song | |
| 2020/0296096 A1* | 9/2020 | Kim | G09G 3/035 |
| 2020/0379510 A1 | 12/2020 | Aurongzeb | |
| 2023/0044526 A1* | 2/2023 | Kwon | G06F 1/1681 |
| 2024/0094767 A1* | 3/2024 | Lee | G06F 1/1652 |

FOREIGN PATENT DOCUMENTS

| | | |
|---|---|---|
| CN | 107783597 | 3/2018 |
| CN | 107831993 | 3/2018 |
| CN | 108475174 | 8/2018 |
| CN | 108845711 | 11/2018 |
| CN | 109074219 | 12/2018 |
| CN | 114546160 | 3/2023 |
| EP | 2 759 902 | 7/2014 |
| JP | 2017-142657 | 8/2017 |
| KR | 10-2013-0113901 | 10/2013 |
| KR | 10-2014-0115226 | 9/2014 |
| KR | 10-1515630 | 4/2015 |
| KR | 10-2016-0012779 | 2/2016 |
| KR | 10-2016-0117381 | 10/2016 |
| KR | 10-1698106 | 1/2017 |
| KR | 10-2017-0140976 | 12/2017 |
| RU | 2016137482 | 3/2018 |
| WO | 2015/096084 | 7/2015 |

OTHER PUBLICATIONS

International Search Report and Written Opinion dated Mar. 17, 2020 in counterpart International Patent Application No. PCT/KR2019/017106.
Extended Search Report and Written Opinion dated Jun. 9, 2020 in counterpart European Patent Application No. 20158021.4.
Communication pursuant to Article 94(3) EPC dated May 26, 2021 in counterpart European Application No. 20158021.4.
Notification of the First Office Action dated Jul. 19, 2021 in counterpart Chinese Application No. 201911251794.8 and English language translation.
Summons to attend oral proceedings pursuant to Rule 115(1) EPC dated Nov. 16, 2021 in EP Application No. 20158021.4.
Office Action dated May 27, 2022 in Russian Application No. 2021124446/28(051405) and English-language translation.
Office Action dated Aug. 19, 2022 in Chinese Application No. 202210050653.5 and English-language translation.
Search Report dated Oct. 30, 2022 in Chinese Application No. 2022100506535.5 and English-language translation.
Decision to Grant dated Sep. 9, 2022 in Russian Application No. 2021124446 and English-language translation.
Extended European Search Report dated Jan. 13, 2023 in EP Application No. 22186543.9.
Office Action dated Jul. 17, 2023 in Chinese Application No. 202210050666.2 and English-language translation.
Lee et al., U.S. Appl. No. 16/707,192, filed Dec. 9, 2019, now U.S. Pat. No. 11,054,856.
Lee et al., U.S. Appl. No. 17/366,578, filed Jul. 2, 2021.
Communication pursuant to Article 94(3) EPC dated Jul. 23, 2024 in European Patent Application No. 22186543.9.

* cited by examiner

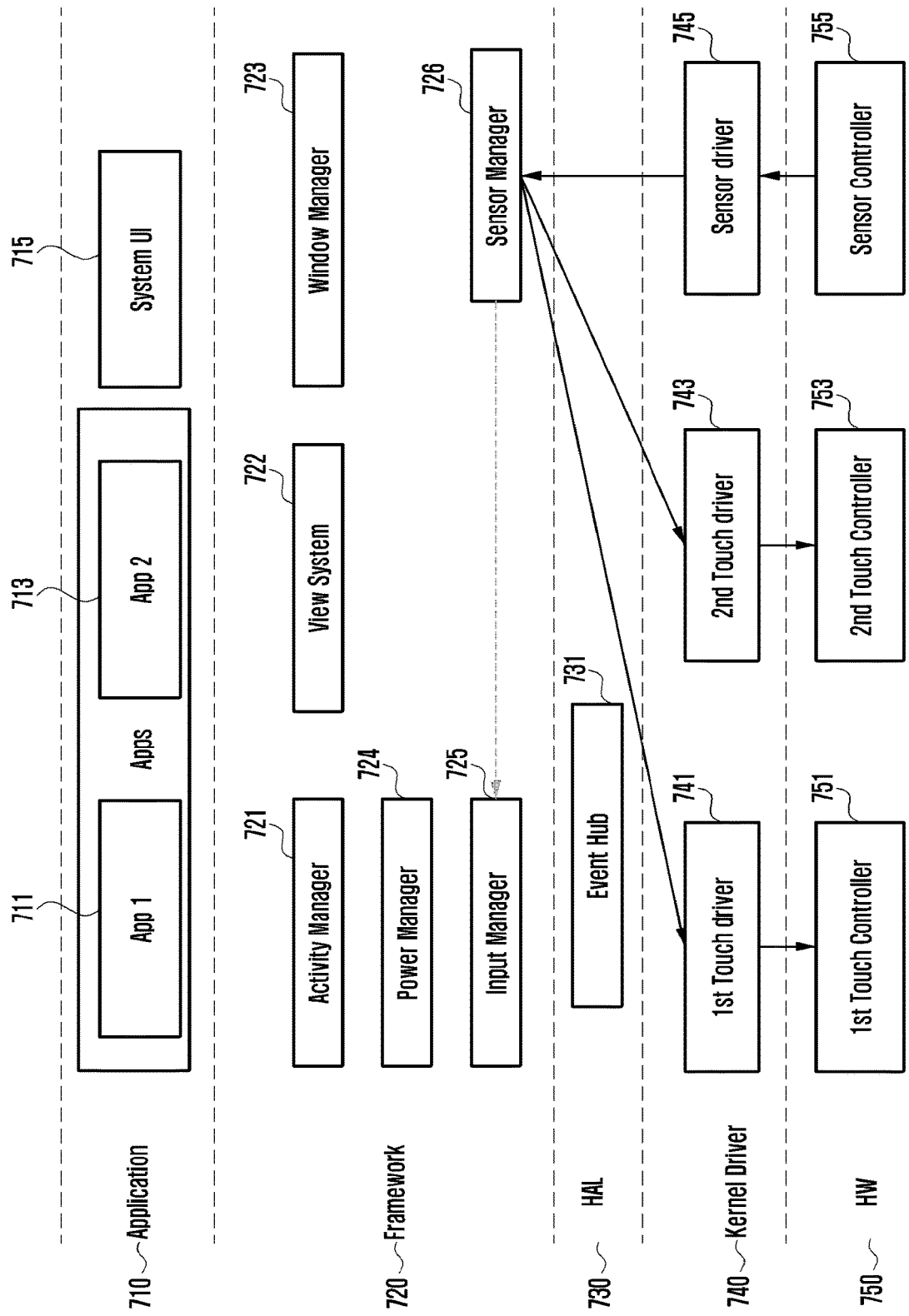

ELECTRONIC DEVICE FOR REDUCING OCCURRENCE OF UNINTENDED USER INPUT AND OPERATION METHOD FOR THE SAME

CROSS-REFERENCE TO RELATED APPLICATIONS

This application is a continuation of U.S. application Ser. No. 17/366,578, filed on Jul. 2, 2021, which is a continuation of U.S. application Ser. No. 16/707,192, filed on Dec. 9, 2019, now U.S. Pat. No. 11,054,856, which claims priority to Korean Patent Application No. 10-2019-0019492, filed Feb. 19, 2019. The contents of each of these applications are incorporated herein in their entirety.

BACKGROUND

1) Field

The disclosure relates to an electronic device and a method of operating an electronic device and, for example, to a technique for reducing an occurrence of the reception of an unintended user input.

2) Description of Related Art

Various electronic devices, such as smartphones, tablet PCs, portable multimedia players (PMPs), personal digital assistants (PDAs), laptop personal computers (PCs), wearable devices, and the like, are widely used. Furthermore, in recent years, an electronic device that has a flexible display, which can be bent, and is able to be folded (e.g., a foldable device) has come into wide use.

Recently, research and development on a foldable electronic device in which a housing can be in a folded state or an unfolded state with respect to a hinge structure have been actively conducted. The foldable electronic device is expected to be a next-generation electronic device that can expand the display area in an unfolded state while reducing the volume in a folded state, thereby increasing the user convenience.

If a user folds a foldable device in an unfolded state or unfolds a foldable device in a folded state, the user may come into contact with a touch screen display included in the foldable device. The foldable device may receive unintended user input on the touchscreen display while it is being folded or unfolded. The foldable device may execute a function, which is not intended by the user, due to the reception of the unintended user input, thereby causing inconvenience to the user in using the foldable device.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide an electronic device which may include: a foldable housing comprising a hinge a first housing connected to the hinge and including a first surface facing a first direction and a second surface facing a second direction opposite the first direction, and a second housing connected to the hinge and including a third surface facing a third direction and a fourth surface facing a fourth direction opposite the third direction, the second housing configured to be foldable with respect to the first housing about the hinge wherein the first surface faces the third surface in a folded state of the electronic device; a display extending from the first surface to the third surface providing the first surface and the third surface and including a touch controller configured to control a receiving function of an input on the display; a processor disposed inside the first or second housing and operatively coupled to the display; and a memory operatively connected to the processor, wherein the memory is configured to store instructions that, when executed, cause the processor to control the electronic device to: detect occurrence of an event of changing an angle between the first housing and the second housing; receive a touch interrupt produced based on an input on the display; identify characteristics of the input in response to detecting the occurrence of the change in the angle; and determine whether to cancel the touch event corresponding to the input based on the characteristics of the input.

An electronic device according to various example embodiments may include: a foldable housing including a hinge, a first housing connected to the hinge and including a first surface facing a first direction and a second surface facing a second direction opposite the first direction, and a second housing connected to the hinge and including a third surface facing a third direction and a fourth surface facing a fourth direction opposite the third direction, the second housing configured to be foldable with respect to the first housing about the hinge such that the first surface faces the third surface in a folded state; a first display extending from the first surface to the third surface defining the first surface and the third surface and including a first touch controller configured to control a receiving function of an input on the first display; a second display defining the second surface or the fourth surface and including a second touch controller configured to control a receiving function of an input on the second display; a processor disposed inside the first or second housing and operatively coupled to the first display and the second display; and a memory operatively connected to the processor, wherein the memory may be configured to store instructions that, when executed, cause the processor to control the electronic device to: detect the occurrence of an event of changing an angle between the first housing and the second housing; identify characteristics of the input in response to detecting the occurrence of a change in the angle; and determine whether to cancel the touch event corresponding to the input based on the characteristics of the user input.

A method of operating an electronic device according to various example embodiments may include: detecting whether an event of changing an angle between a first housing connected to a hinge and including a first surface facing a first direction and a second surface facing a second direction opposite the first direction, and a second housing connected to the hinge and including a third surface facing a third direction and a fourth surface facing a fourth direction opposite the third direction, the second housing configured to be foldable with respect to the first housing about the hinge, occurs; receiving a touch interrupt produced based on an input on a display; identifying the characteristics of the input in response to detecting the occurrence of the change in the angle; and determining whether to cancel the touch event corresponding to the input based on the characteristics of the input.

An electronic device and a method of operating an electronic device according to various example embodiments can prevent and/or reduce the reception of unintended input by cancelling a touch event corresponding to an input, based on characteristics of a received input, if an event of changing the angle between a first housing and a second housing occurs.

An electronic device and a method of operating an electronic device according to various example embodiments of the disclosure can prevent and/or reduce the reception of unintended input (e.g., user input) by controlling a touch controller connected to a display such that the touch controller does not produce an interrupt if an event of changing the angle between a first housing and a second housing occurs.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7C is a diagram illustrating an example of reducing an occurrence of an unintended user input in an electronic device according to various embodiments;

DETAILED DESCRIPTION

Figure 1:
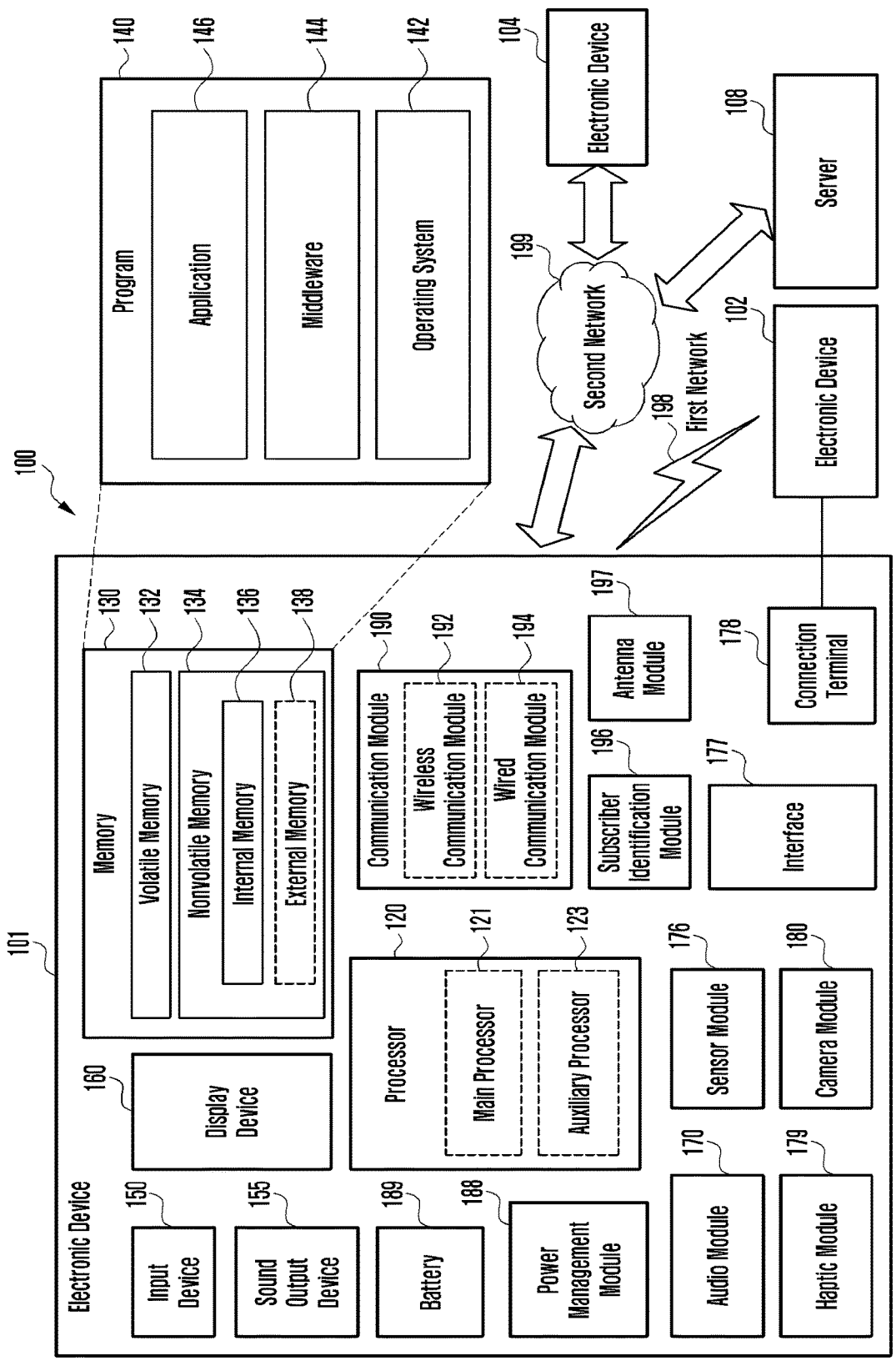
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
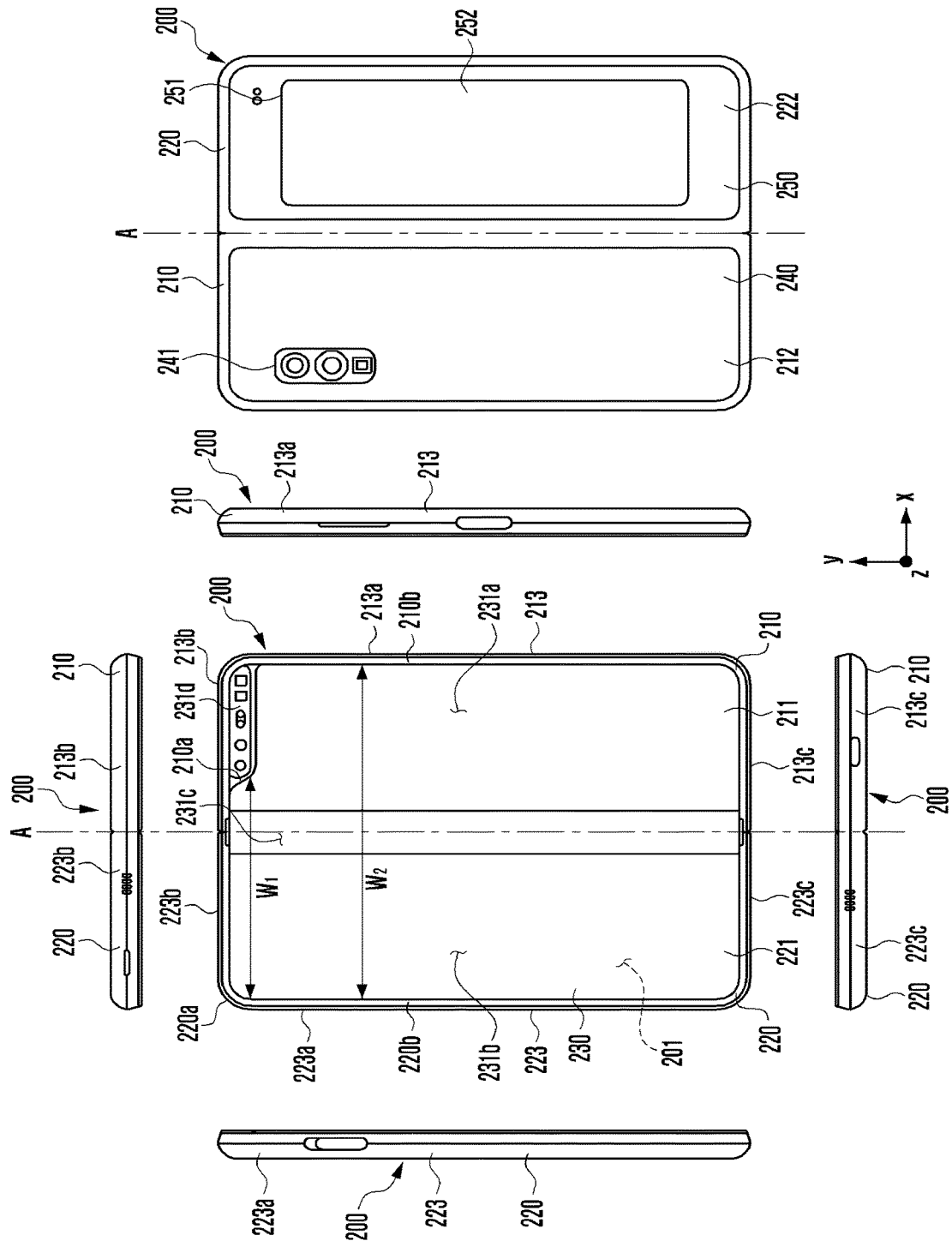
FIG. 2A is a diagram illustrating an example electronic device in an unfolded state according to various embodiments.
Figure 2B:
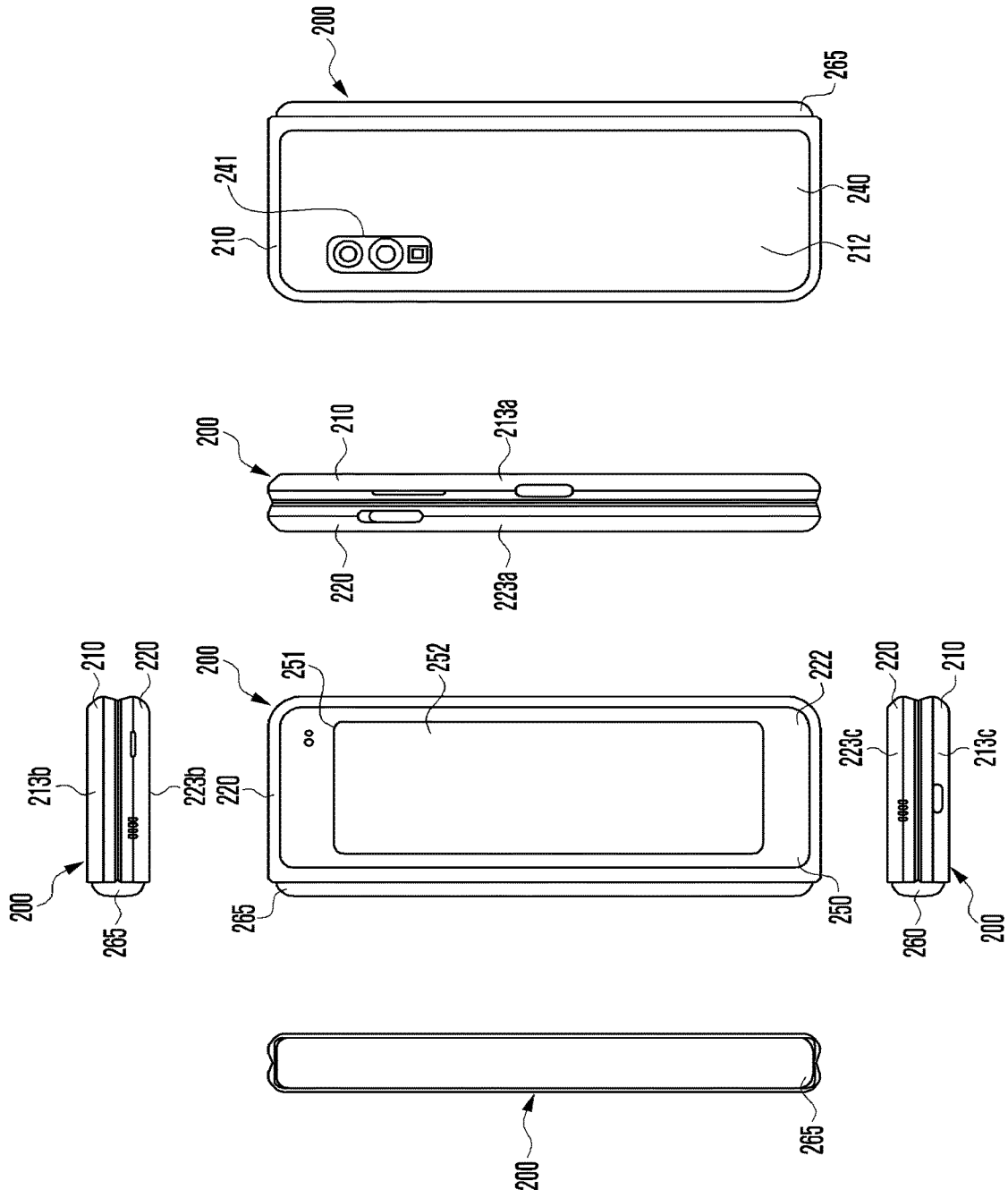
FIG. 2B is a diagram illustrating an example electronic device in a folded state according to various embodiments.

FIG. 2A is a diagram illustrating an example electronic device 200 in an unfolded state according to various embodiments, and FIG. 2B is a diagram illustrating the electronic device 200 shown in FIG. 2A in a folded state according to various embodiments.

The electronic device 200 in FIGS. 2A and 2B may be, at least in part, similar to the electronic device 101 in FIG. 1, or may include other embodiments of the electronic device.

Referring to FIG. 2A, the electronic device 200 may include a pair of housing structures 210 and 220 rotatably coupled to each other through a hinge, e.g., a hinge structure (e.g., a hinge structure 264 in FIG. 3) so as to be folded relative to each other, a hinge cover 265 covering a foldable portion of the pair of housing structures 210 and 220, and a display 230 (e.g., a flexible display or a foldable display) provided in a space formed by the pair of housing structures 210 and 220. The terms hinge and hinge structure may be used interchangeably herein. In this disclosure, a surface on which the display 230 is provided may be a front surface of the electronic device 200, and a surface opposite the front surface may be a rear surface of the electronic device 200. In addition, the surface surrounding the space between the front surface and the rear surface may be a side surface of the electronic device 200.

In an embodiment, the pair of housing structures 210 and 220 may include a first housing structure 210 including a sensor area 231d, a second housing structure 220, a first rear cover 240, and a second rear cover 250. The pair of housing structures 210 and 220 of the electronic device 200 is not limited to the shape and connection shown in FIGS. 2A and 2B, but may be implemented by combinations and/or connections of other shapes or components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be provided at both sides with respect to a folding axis (an axis A), and may have shapes that are symmetric overall with respect to the folding axis (the axis A). According to an embodiment, an angle or a distance between the first housing structure 210 and the second housing structure 220 may vary depending on whether the electronic device 200 is in an unfolded state, an folded state, or an intermediate state. According to an embodiment, unlike the second housing structure 220, the first housing structure 210 may further include a sensor area 231d in which various sensors are provided, but may be symmetric with the second housing structure 220 in the area other than the sensor area 231d. In another embodiment, the sensor area 231d may be further provided in or replaced with at least a portion of the second housing structure 220.

In an embodiment, the first housing structure 210 may be connected to a hinge structure (e.g., a hinge structure 264 in FIG. 3), and may have a first surface 211 provided to face the front surface of the electronic device 200 in an unfolded state of the electronic device 200, a second surface 212 directed in the direction opposite the first surface 211, and a first side member 213 surrounding at least a portion of the space between the first surface 211 and the second surface 212. In an embodiment, the first side member 213 may include a first side surface 213a provided in parallel to the folding axis (the axis A), a second side surface 213b extending from one end of the first side surface 213a in the direction perpendicular to the folding axis, the third side surface 213c extending from the opposite end of the first side surface 213a in the direction perpendicular to the folding axis (the axis A).

In an embodiment, the second housing structure 220 may be connected to a hinge structure (e.g., a hinge structure 264 in FIG. 3), and may have a third surface 221 provided to face the front surface of the electronic device 200 in an unfolded state of the electronic device 200, a fourth surface 222 directed in the direction opposite the third surface 221, and a second side member 220 surrounding at least a portion of the space between the third surface 221 and the fourth surface 222. In an embodiment, the second side member 220 may include a fourth side surface 223a provided in parallel to the folding axis (the axis A), a fifth side surface 223b extending from one end of the fourth side surface 223a in the direction perpendicular to the folding axis (the axis A), and a sixth side surface 223c extending from the opposite end of the fourth side surface 223a in the direction perpendicular to the folding axis (the axis A). In an embodiment, the third surface 221 may face the first surface 211 in a folded state.

In an embodiment, the electronic device 200 may include a recess 201 formed to receive a display 230 through structural shape coupling of the first housing structure 210 and the second housing structure 220. The recess 201 may have substantially the same size as the display 230. In an embodiment, the recess 201 may have two or more different widths in the direction perpendicular to the folding axis (the axis A) due to the sensor area 231d. For example, the recess 201 may have a first width (W1) between a first portion 220a parallel to the folding axis (the axis A) of the second housing structure 220 and a first portion 210a formed at the edge of the sensor area 231d of the first housing structure 210 and a second width (W2) between a second portion 220b of the second housing structure 210 and a second portion 210b that is parallel to the folding axis (the axis A) and does not belong to the sensor area 213*d* in the first housing structure 210. In this case, the second width (W2) may be greater than the first width (W1). For example, the recess 201 may be formed so as to have a first width (W1) from a first portion 210*a* of the first housing structure 210, which has an asymmetric shape, to a first portion 220*a* of the second housing structure 220 and a second width (W2) from the second portion 210*b* of the first housing structure 210, which has a symmetric shape, to the second portion 220*b* of the second housing structure 220. In an embodiment, the first portion 210*a* and the second portion 210*b* of the first housing structure 210 may be formed so as to have different distances from the folding axis (the axis A). The width of the recess 201 is not limited to the illustrated example. In various embodiments, the recess 201 may have two or more different widths due to the shape of the sensor area 213*d* or the asymmetric shapes of the first housing structure 210 and the second housing structure 220.

In an embodiment, at least a portion of the first housing structure 210 and the second housing structure 220 may be made of a metallic or non-metallic material having a selected intensity of rigidity in order to support the display 230.

In an embodiment, the sensor area 231*d* may be provided adjacent to a corner of the first housing structure 210 so as to have a predetermined area. However, the arrangement, shape, or size of the sensor area 231*d* is not limited to the illustrated example. For example, in other embodiments, the sensor area 231*d* may be provided at another corner of the first housing structure 210 or in any area between the top and bottom corners. In another embodiment, the sensor area 231*d* may be provided in at least a portion of the second housing structure. In another embodiment, the sensor area 231*d* may be arranged to extend over the first housing structure 210 and the second housing structure 220. In an embodiment, the electronic device 200 may include components that are arranged to be exposed to the front surface of the electronic device 200 through the sensor area 213*d* or through one or more openings provided in the sensor area 231*d*, thereby executing various functions. In various embodiments, the components may include at least one of, for example, a front camera device, a receiver, a proximity sensor, an illuminance sensor, an iris recognition sensor, an ultrasonic sensor, or an indicator.

In an embodiment, the first rear cover 240 may be provided on the second surface 212 of the first housing structure 210, and may have a substantially rectangular periphery. In an embodiment, at least a portion of the periphery may be wrapped by the first housing structure 210. Similarly, the second rear cover 250 may be provided on the fourth surface 222 of the second housing structure 220, and at least a portion of the periphery thereof may be wrapped by the second housing structure 220.

In the illustrated embodiment, the first rear cover 240 and the second rear cover 250 may be substantially symmetric with respect to the folding axis (the axis A). In another embodiment, the first rear cover 240 and the second rear cover 250 may have various shapes different from each other. In another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may be coupled to each other to provide a space to receive various components of the electronic device 200 (e.g., a printed circuit board, an antenna module, a sensor module, or a battery). In an embodiment, one or more components may be provided on the rear surface of the electronic device 200, or may be visually exposed therefrom. For example, one or more components or sensors may be visually exposed through a first rear area 241 of the first rear cover 240. In various embodiments, the sensor may include a proximity sensor, a rear camera device, and/or a flash. In another embodiment, at least a portion of a sub-display 252 may be visually exposed through a second rear area 251 of the second rear cover 250.

The display 200 may be provided in a space formed by the foldable housing 210 and 220. For example, the display 200 may be placed in a recess (e.g., the recess 201 in FIG. 2A) formed by the pair of housing structures 210 and 220, and may be arranged so as to substantially occupy most of the front surface of the electronic device 200. Accordingly, the front surface of the electronic device 200 may include a display 230, a portion (e.g., an edge area) of the first housing structure 210 adjacent to the display 230, and a portion (e.g., an edge area) of the second housing structure 220. In an embodiment, the rear surface of the electronic device 200 may include a first rear cover 240, a portion (e.g., an edge area) of the first housing structure 210 adjacent to the first rear cover 240, a second rear cover 250, and a portion (e.g., an edge area) of the second housing structure 220 adjacent to the second rear cover 250.

In an embodiment, the display 230 may refer to a display of which at least a portion may be transformed into a flat or curved surface. In an embodiment, the display 230 may include a folding area 231*c*, a first area 231*a* provided at one side of the folding area 231*c* (e.g., at the right side of the folding area 231*c*), and a second area 231*b* provided at the opposite side of the folding area 231*c* (e.g., at the left side of the folding area 231*c*). For example, the first area 231*a* may be provided on the first surface 211 of the first housing structure 210, and the second area 231*b* may be provided on the third surface 221 of the second housing structure 220. In an embodiment, the division of the display 230 is illustrated as only an example, and the display 230 may be divided into a plurality of areas (e.g., two areas or four or more areas) according to the structure or functions thereof. Although the area of the display 230 may be divided with respect to the folding area 231*c* or the folding axis (the axis A) extending in parallel to the y-axis in the embodiment shown in FIG. 2A, the display 230 may be divided based on another folding area (e.g., a folding area parallel to the x-axis) or another folding axis (e.g., a folding axis parallel to the x-axis) in another embodiment. Even though the display is physically divided into several areas by the pair of housing structures 210 and 220 and the hinge structure (e.g., the hinge structure 264 in FIG. 3) as described above, the display 230 may substantially display a full screen through the pair of housing structures 210 and 220 and the hinge structure (e.g., the hinge structure 264 in FIG. 3). In an embodiment, the first area 231*a* and the second area 231*b* may have a symmetric shape overall with respect to the folding area 231*c*. However, unlike the second area 231*b*, the first area 231*a* may include a notch area (e.g., a notch area 233 in FIG. 3) obtained by cutting an area corresponding to the sensor area 231*d*, but other portions of the first area 231*a*, excluding the notch area, may be symmetric with the second area 231*b*. For example, the first area 231*a* and the second area 231*b* may include portions having a symmetric shape and portions having an asymmetric shape.

Figure 3:
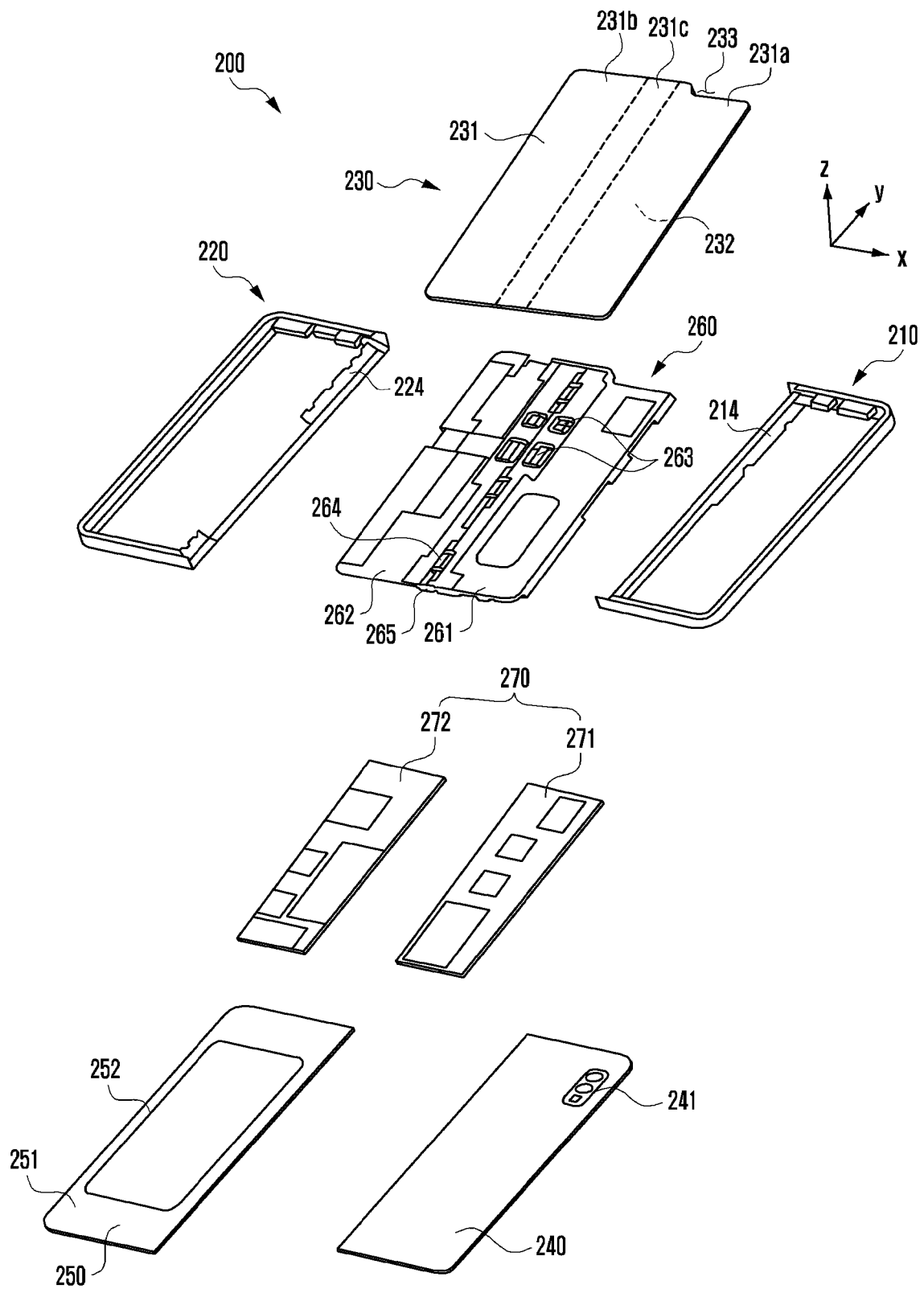
FIG. 3 is an exploded perspective view illustrating an example electronic device according to various embodiments.

Referring to FIG. 2B, the hinge cover 265 is provided between the first housing structure 210 and the second housing structure 220 so as to cover internal components (e.g., the hinge structure 264 in FIG. 3). In an embodiment, the hinge cover 265 may be covered or exposed to the outside by a portion of the first housing structure 210 and the second housing structure 220 according to an operating state of the electronic device 200 (an unfolded state or a folded state).

For example, if the electronic device 200 is in an unfolded state as shown in FIG. 2A, the hinge cover 265 may be covered by the first housing structure 210 and the second housing structure 220 so as not to be exposed. For example, if the electronic device 200 is in a folded state (e.g., a completely folded state) as shown in FIG. 2B, the hinge cover 265 may be exposed to the outside between the first housing structure 210 and the second housing structure 220. For example, if the electronic device 200 is in an intermediate state in which the first housing structure 210 and the second housing structure 220 are folded at a certain angle, a portion of the hinge cover 265 may be exposed to the outside of the electronic device 200 between the first housing structure 210 and the second housing structure 220. In this case, the exposed area may be smaller than that in the fully folded state. In an embodiment, the hinge cover 265 may include a curved surface.

Hereinafter, the operation of the first housing structure 210 and the second housing structure 220 and respective areas of the display 230 according to the operating state of the electronic device 200 (e.g., an unfolded state and a folded state) will be described.

In an embodiment, if the electronic device 200 is in an unfolded state (e.g., the state shown in FIG. 2A), the first housing structure 210 and the second housing structure 220 are at an angle of 180 degrees with each other, and the first area 231a and the second area 231b of the display may be provided to be directed in the same direction. In addition, the folding area 231c may be on the same plane as the first area 231a and the second area 231b.

In an embodiment, if the electronic device 200 is in a folded state (e.g., the state shown in FIG. 2B), the first housing structure 210 and the second housing structure 220 may be arranged so as to face each other. The first area 231a and the second area 231b of the display 230 may face each other at a sharp angle (e.g., 0 degrees to 10 degrees). The folding area 231c may be configured, at least in part, as a curved surface having a predetermined curvature.

In an embodiment, if the electronic device 200 is in an intermediate state, the first housing structure 210 and the second housing structure 220 may be arranged at a certain angle with each other. The first area 231a and the second area 231b of the display 230 may be at an angle greater than the angle in the folded state and smaller than the angle in the unfolded state. The folding area 231c may be configured, at least in part, as a curved surface having a predetermined curvature, and the curvature may be smaller than the angle in the folded state.

FIG. 3 is an exploded perspective view illustrating an example electronic device 200 according to various embodiments.

Referring to FIG. 3, in an embodiment, the electronic device 200 may include a display 230, a bracket assembly 260, one or more printed circuit boards 270, a first housing structure 210, a second housing structure 220, a first rear cover 240, and a second rear cover 250. In this disclosure, the display 230 may be referred to as a "display module" or a "display assembly".

The display 230 may include a display panel 231 (e.g., a flexible display panel) and one or more plates 232 or layers on which the display panel 231 is placed. In an embodiment, the plate 232 may be provided between the display panel 231 and the bracket assembly 260. A display panel 231 may be provided in at least a portion of one surface of the plate 232 (e.g., the surface directed in the z-direction in FIG. 3). The plate 232 may be formed in a shape corresponding to the display panel 231. For example, a portion of the plate 232 may be formed in a shape corresponding to the notch area 233 of the display panel 231.

The bracket assembly 260 may include a first bracket 261, a second bracket 262, a hinge structure 264 provided between the first bracket 261 and the second bracket 262, a hinge cover 265 covering the hinge structure 264 so as not to be viewed from the outside, and a wiring member 263 provided across the first bracket 261 and the second bracket 262 (e.g., a flexible printed circuit board (FPCB)).

In an embodiment, the bracket assembly 260 may be provided between the plate 232 and one or more printed circuit boards 270. For example, the first bracket 261 may be provided between the first area 231a of the display 230 and a first printed circuit board 271. The second bracket 262 may be provided between the second area 231b of the display 230 and a second printed circuit board 272.

In an embodiment, at least a portion of the wiring member 263 and the hinge structure 264 may be provided inside the bracket assembly 260. The wiring member 263 may be arranged in a direction crossing the first bracket 261 and the second bracket 262 (e.g., in the x-axis direction). The wiring member 263 may be arranged in a direction (e.g., the x-axis direction) perpendicular to a folding axis (e.g., the y-axis or the folding axis A in FIG. 1) of the folding area 231c.

One or more printed circuit boards 270 may include a first printed circuit board 271 provided on the side of the first bracket 261 and a second printed circuit board 272 provided on the side of the second bracket 262 as mentioned above. The first printed circuit board 271 and the second printed circuit board 272 may be provided in a space formed by the bracket assembly 260, the first housing structure 210, the second housing structure 220, the first rear cover 240, and the second rear cover 250. The first printed circuit board 271 and the second printed circuit board 272 may have components mounted thereon so as to implement various functions of the electronic device 200.

In an embodiment, the first housing structure 210 and the second housing structure 220 may be assembled so as to be coupled to both sides of the bracket assembly 260 in the state in which the display 230 is coupled to the bracket assembly 260. As described later, the first housing structure 210 and the second housing structure 220 may be coupled to the bracket assembly 260 by sliding on both sides of the bracket assembly 260.

In an embodiment, the first housing structure 210 may include a first rotary support surface 214, and the second housing structure 520 may include a second rotary support surface 224 corresponding to the first rotary support surface 214. The first rotary support surface 214 and the second rotary support surface 224 may include curved surfaces corresponding to curved surfaces provided in the hinge cover 265.

In an embodiment, if the electronic device 200 is in an unfolded state (e.g., the state shown in FIG. 2A), the first rotary support surface 214 and the second rotary support surface 224 may cover the hinge cover 265 so as to prevent the hinge cover 265 of the electronic device 200 from being exposed to the rear surface of the electronic device 200 to minimize and/or reduce the exposure thereof. In an embodiment, if the electronic device 200 is in a folded state (e.g., the state shown in FIG. 2B), the first rotary support surface 214 and the second rotary support surface 224 may rotate along curved surfaces provided in the hinge cover 265 so that the hinge cover 265 may be fully exposed to the rear surface of the electronic device 200.

Figure 4:
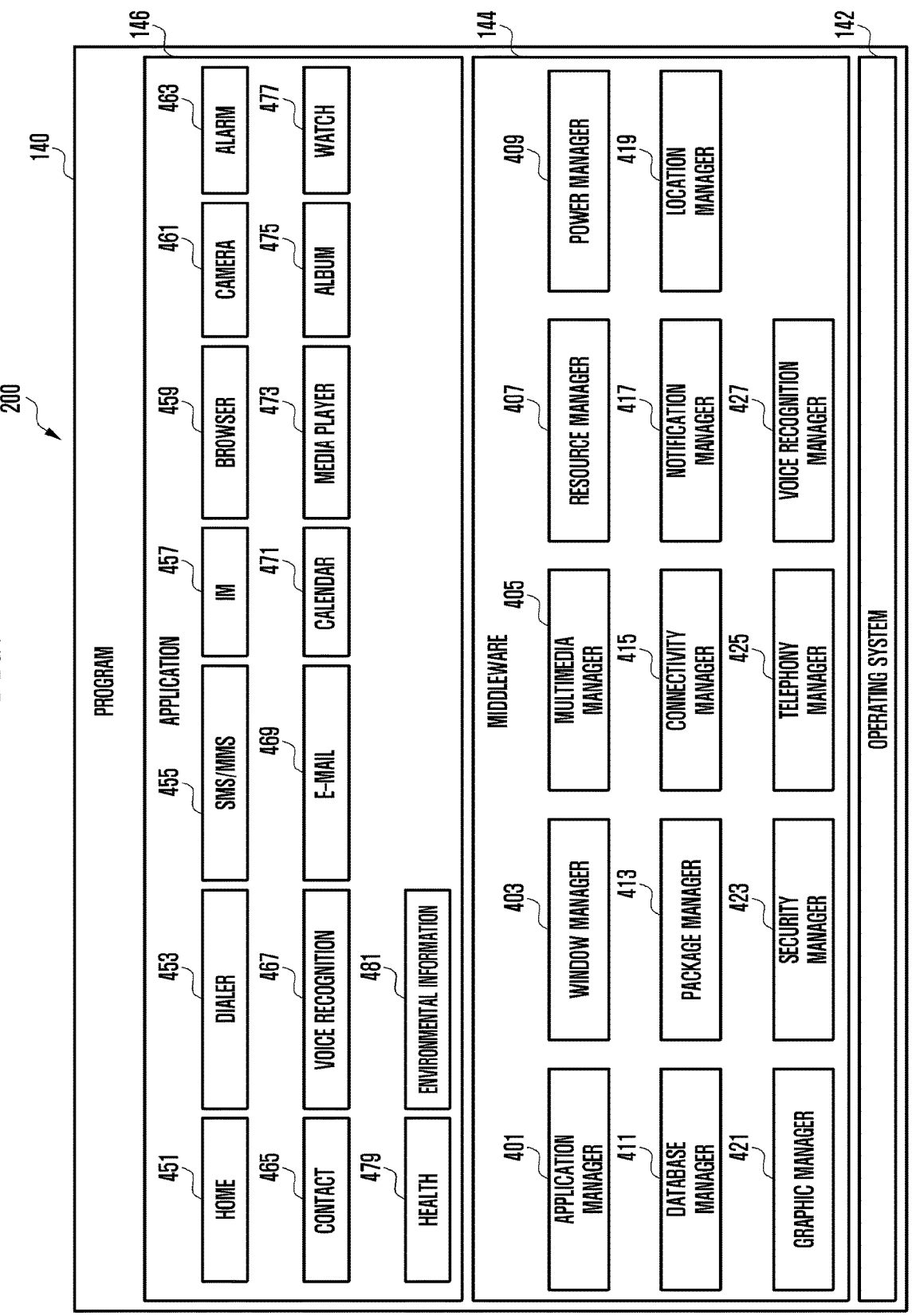
FIG. 4 is a block diagram illustrating an example program according to various embodiments.

FIG. 4 is a block diagram 400 illustrating an example program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™ Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, or a voice recognition manager 427.

The application manager 401, for example, may manage the life cycle of the application 146. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 146 or a memory space of the memory 130. The power manager 409, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 409 may interwork with a basic input/output system (BIOS) (not shown) of the electronic device 101.

The database manager 411, for example, may generate, search, or change a database to be used by the application 146. The package manager 413, for example, may manage installation or update of an application that is distributed in the form of a package file. The connectivity manager 415, for example, may manage a wireless connection or a direct connection between the electronic device 101 and the external electronic device. The notification manager 417, for example, may provide a function to notify a user of an occurrence of a specified event (e.g., an incoming call, message, or alert). The location manager 419, for example, may manage locational information on the electronic device 101. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 101. The voice recognition manager 427, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 444 may dynamically delete some existing components or add new components. According to an embodiment, at least part of the middleware 144 may be included as part of the OS 142 or may be implemented as another software separate from the OS 142.

The application 146 may include, for example, a home 451, dialer 453, short message service (SMS)/multimedia messaging service (MMS) 455, instant message (IM) 457, browser 459, camera 461, alarm 463, contact 465, voice recognition 467, email 469, calendar 471, media player 473, album 475, watch 477, health 479 (e.g., for measuring the degree of workout or biometric information, such as blood sugar), or environmental information 481 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 469) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

FIGS. 5A, 5B, 5C, 5D, 5E and 5F are diagrams illustrating examples of an unintended user input that may occur while an angle between a first housing structure and a second housing structure changes in an electronic device according to various embodiments.

Referring to FIGS. 5A, 5B, 5C, 5D, 5E, and 5F, an electronic device 200 (e.g., the electronic device 101 in FIG. 1) according to various embodiments may include a foldable housing 510, a first display 530, and a second display 540.

According to various embodiments, the electronic device 200 may include a foldable housing 510. The foldable housing 510 may include a first housing structure 210 and a second housing structure 220, which are connected by a hinge (e.g., the hinge structure 264 in FIG. 3).

According to various embodiments, the second housing structure 220 may be connected to the first housing structure 210 so as to be foldable. The first housing structure 210 and the second housing structure 220 may be foldable about a folding axis 520 (e.g., the folding axis (axis A) in FIG. 2A) extending in a first direction. The first housing structure 210 and the second housing structure 220 may be arranged to face each other in a folded state.

Figure 5A:
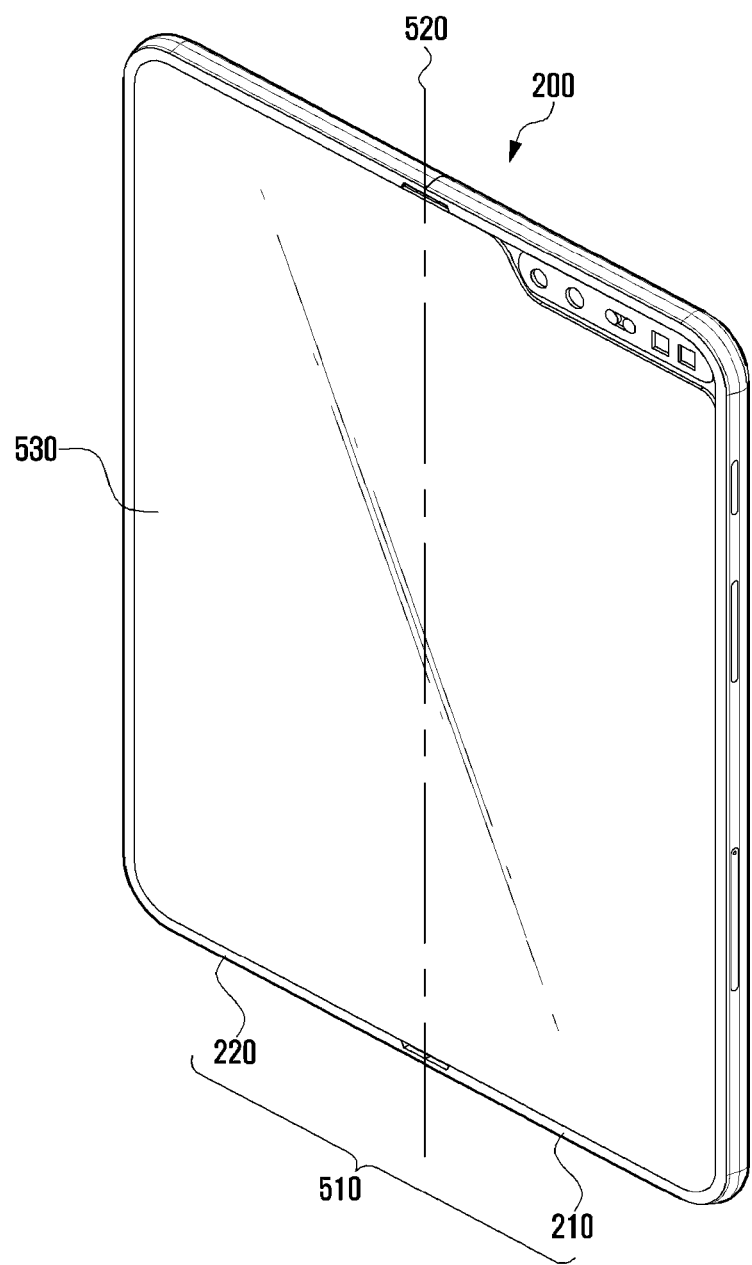
FIGS. 5A, 5B, 5C, 5D, 5E and 5F are diagrams illustrating examples of an unintended user input that may occur while an angle between a first housing structure and a second housing structure changes in an electronic device according to various embodiments.

Referring to FIG. 5A, the first housing structure 210 and the second housing structure 220 may be at an angle of 180 degrees. If the angle between the first housing structure 210 and the second housing structure 220 is equal to or greater than a predetermined angle, the electronic device 300 may be referred to as being in an unfolded state. The predetermined angle may be 180 degrees, but may vary according to the designer's intention. If the electronic device 200 is in an unfolded state, the first housing structure 210 and the second housing structure 220 may form a planar structure.

According to various embodiments, the first display 530 (e.g., the display 230 in FIG. 2A) may be implemented as a single flexible display covering at least a portion of front surfaces of the first housing structure 210 and the second housing structure 220 (e.g., the first surface in FIG. 2A and the third surface 221 in FIG. 2A). The first display 530 may include a touch sensor for receiving a user touch input or a pressure sensor for receiving a pressure touch (or force touch) input of the user. While the electronic device 200 is in the folded state, one portion of the first display 530 implemented on the first housing structure 210 (e.g., the first area 231a in FIG. 2A) and the opposite portion of the first display 530 implemented on the second housing structure 220 (e.g., the second area 231b in FIG. 2A) may face each other. In an unfolded state of the electronic device 200, one portion of the first display 530 implemented on the first housing structure 210 and the opposite portion of the first display 530 implemented on the second housing structure 220 may form a plane. The first display 530 may include an area that is bent when folded or unfolded (e.g., the folding area 231c in FIG. 2A).

Figure 5B:
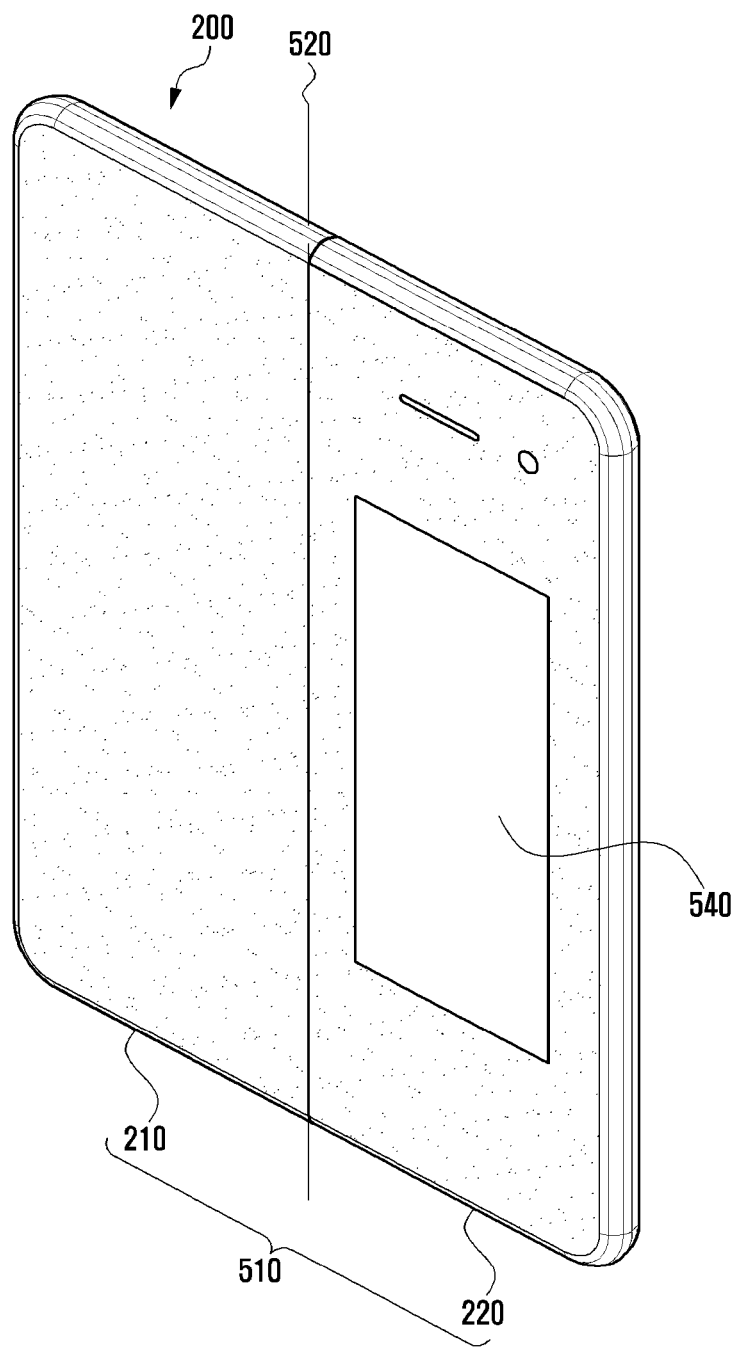

Referring to FIG. 5B, the electronic device 200 according to various embodiments may further include a second display 540 (e.g., the sub-display 252 in FIG. 2A). The second display 540 may be implemented on the surface other than the first display 520. For example, the first display 520 may be implemented on the front surface of the electronic device 200, and the second display may be implemented a second rear cover (e.g., the second rear cover 250 in FIG. 2A) provided on the rear surface thereof (e.g., the fourth surface 222 in FIG. 2A).

Figure 5C:
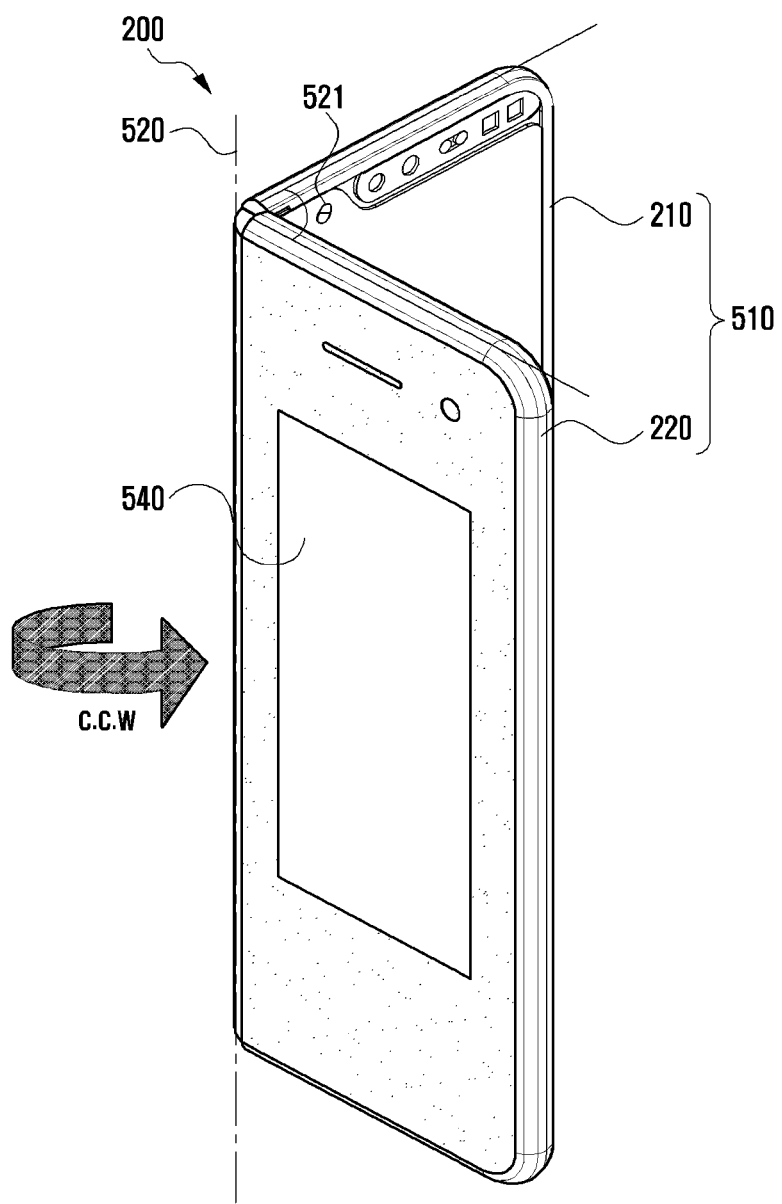
Figure 5D:
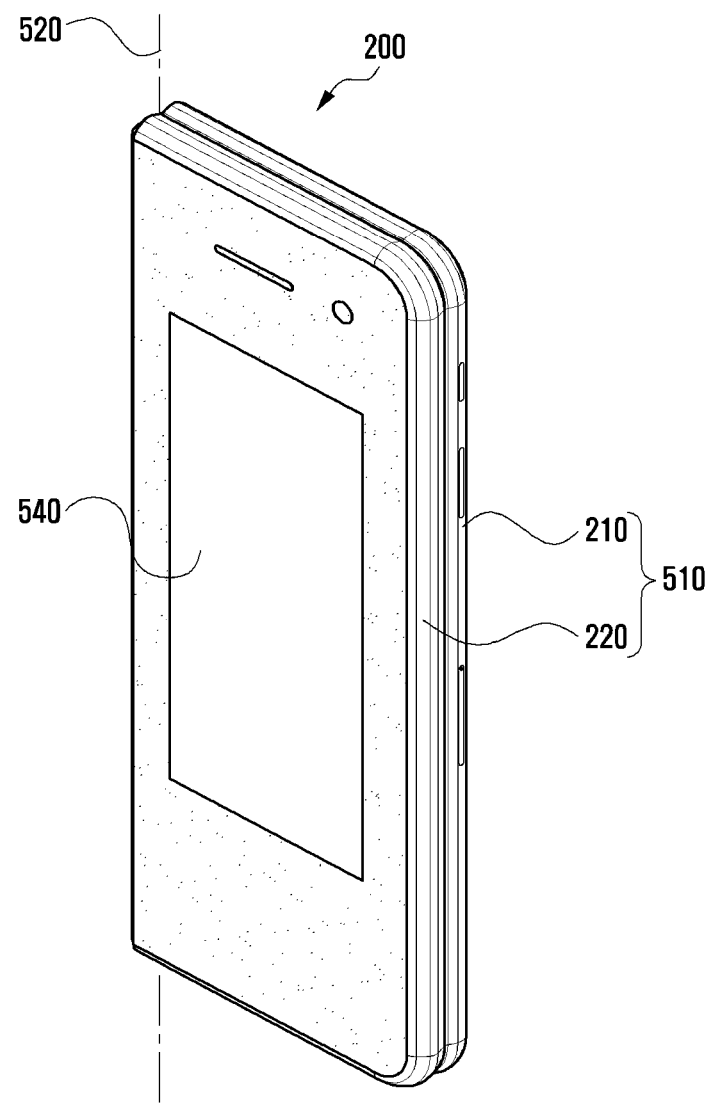

FIG. 5C is a diagram illustrating an electronic device 200 that is folded in a counterclockwise (CCW) direction about a folding axis 520 according to various embodiments. FIG. 5D is a diagram illustrating an example in which the electronic device 200 is fully folded about the folding axis 520 according to various embodiments.

Referring to FIGS. 5C and 5D, a user of the electronic device 200 may fold the electronic device 200 in an unfolded state about the folding axis 520, or may unfold the electronic device 200 in a folded state about the folding axis 520 by applying force thereto.

According to various embodiments, the electronic device 200 may receive an input (e.g., a user input) on the first display 530 or the second display 540 while the electronic device 200 is being folded or unfolded. The electronic device 200 may receive a user input produced by a body part of the user in contact with the first display 530 or the second display 540 or due to an increase in the contact area thereof while the user changes the folding state of the electronic device 200 using a body part (e.g., a hand) of the user. A user input produced by a body part of the user in contact with the first display 530 or the second display 540 while changing the folding state of the electronic device 200 may be a touch unintended by the user. For example, the unintended touch of the user may be a contact for folding or unfolding the electronic device 200, but may not be a touch for operating a specific function of the electronic device 101 (e.g., execution of an application).

Figure 5E:
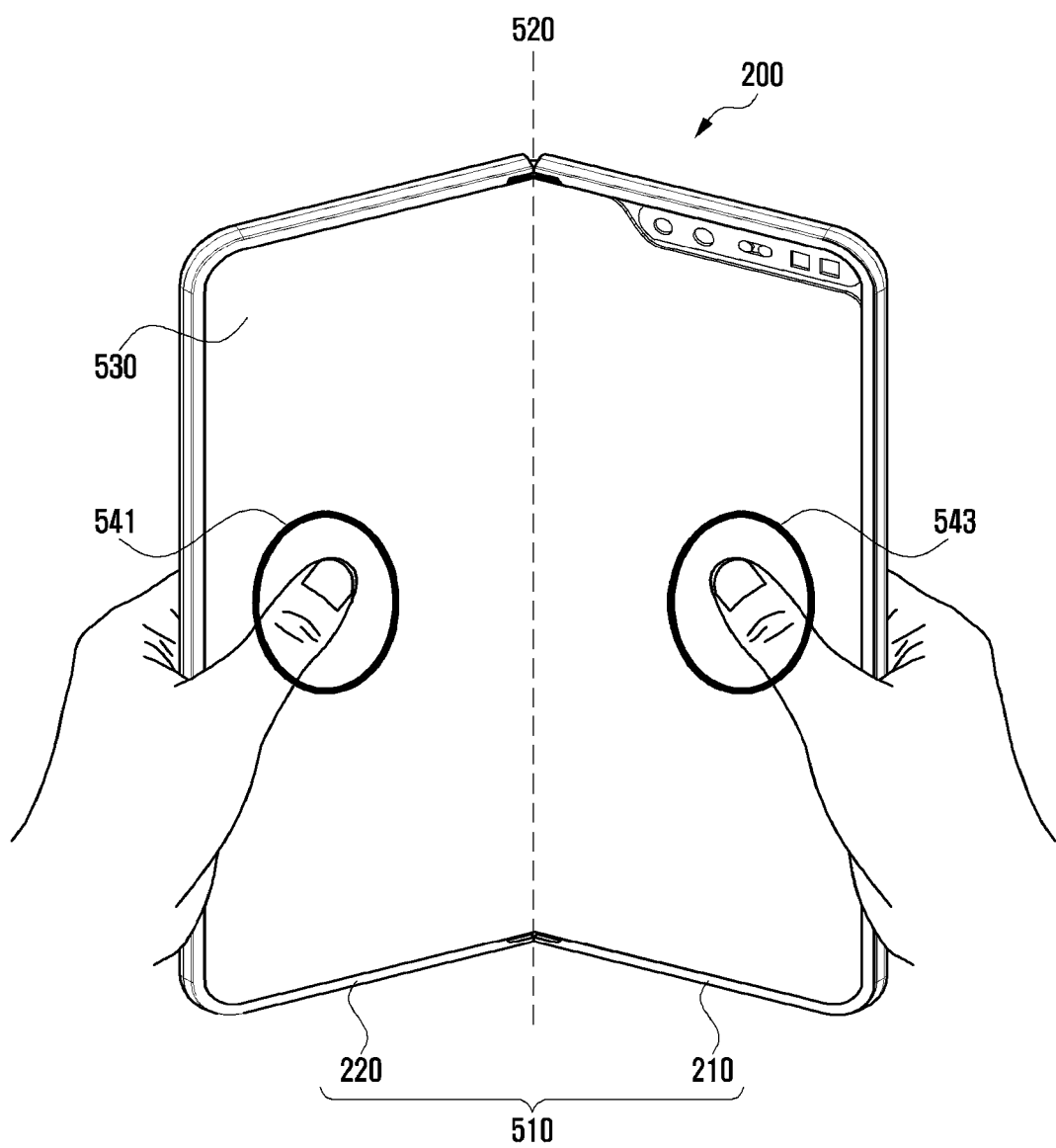

Referring to FIG. 5E, the electronic device 200 may receive a user input on the first display 530 while the electronic device 200 is being folded or unfolded. For example, the electronic device 200 may receive a user input in portions 541 and 543 of the first display 530. The user input applied on the first display 530 while the electronic device 200 is being folded or unfolded may be an unintended touch. In addition, if the electronic device 200 detects an operation of folding or unfolding the electronic device 200 within a predetermined time after receiving a user input, the received user input may be an unintentional touch.

Figure 5F:
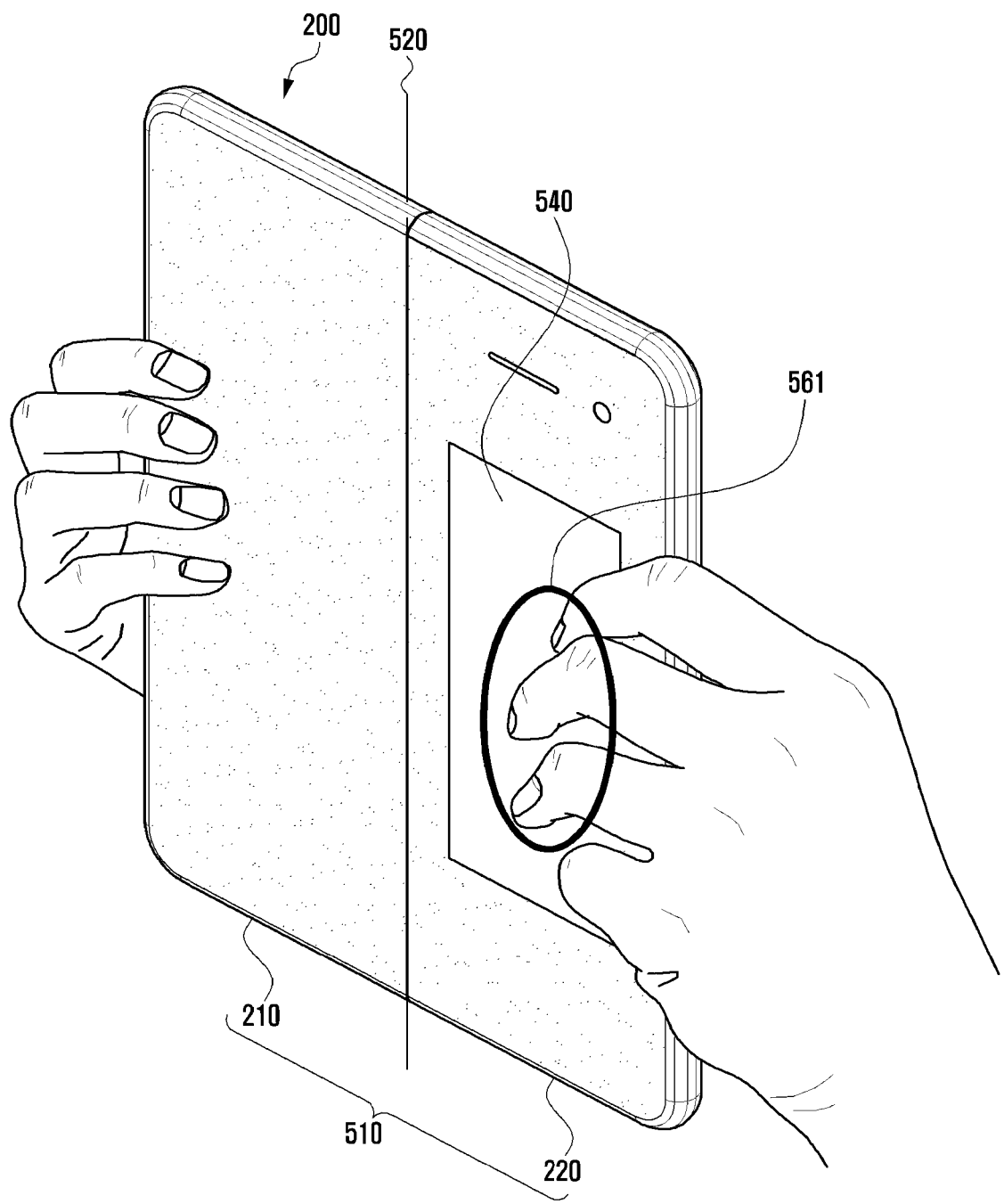

Referring to FIG. 5F, the electronic device 200 may receive a user input on the second display 540 while the electronic device 200 is being folded or unfolded. For example, the electronic device 200 may receive a user input on a portion 561 of the second display 540. The user input applied to the second display 540 while the electronic device 200 is being folded or unfolded may be an unintended touch.

According to various embodiments, an unintended input of the user caused by a body part of the user touching the first display 530 or the second display 540 while changing the folding state of the electronic device 200 may cause an operation that is not related to the user's intention (e.g., execution of an unintended application, unintended termination of a running application, or execution of an unintended function of a running application). Hereinafter, various example embodiments of processing an unintentional user input in order to prevent and/or reduce the likelihood of an operation of the electronic device 200 irrelevant to the intention of the user will be described.

Figure 6:
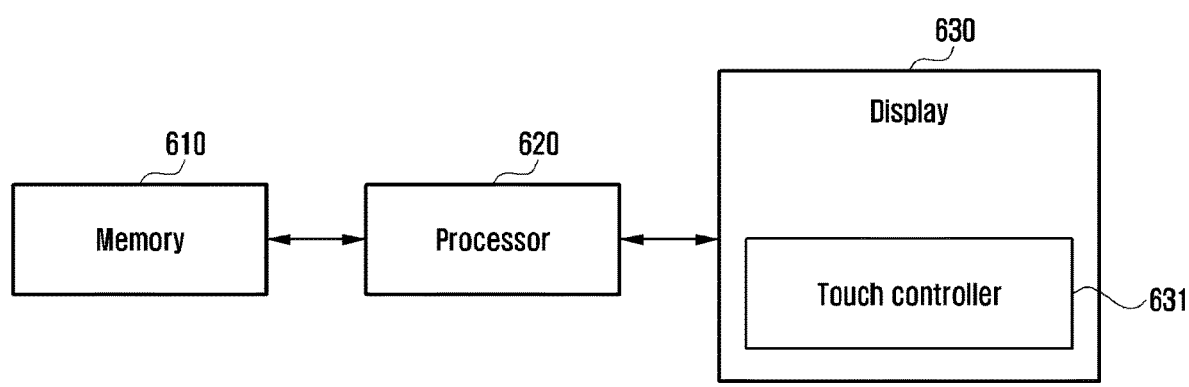
FIG. 6 is a block diagram illustrating an example electronic device according to various embodiments.

FIG. 6 is a block diagram illustrating an example electronic device according to various embodiments.

Referring to FIG. 6, an electronic device (e.g., the electronic device 200 in FIG. 2A) according to various embodiments may include a memory 610 (e.g., the memory 130 in FIG. 1), a processor (e.g., including processing circuitry) 620 (e.g., the processor 120 in FIG. 1), a display 630 (e.g., the display device 160 in FIG. 1, the first display 530 in FIG. 5A, or the second display 540 in FIG. 5B) and a touch controller (e.g., including touch controlling circuitry) 631.

According to various embodiments, the display 630 may display various still images or moving images under the control of the processor 620. The display 630 may receive inputs by various external objects (e.g., a human hand) on the display 630. The display 630 may include a touch sensor (not shown) and a touch controller 631 including various touch controlling circuitry to receive inputs by various external objects. The touch controller 631 may be operatively or electrically connected to the touch sensor, and may identify changes in various physical characteristics (e.g., current, voltage, or capacitance) collected by the touch sensor according to inputs by external objects. The touch controller 631 may measure physical characteristics using the touch sensor at a regular interval (e.g., a sampling rate).

Upon receiving the user input, the touch controller 631 may produce a touch interrupt corresponding to the user input, and may transmit the produced touch interrupt and information related to the user input to the processor 620. The touch interrupt may include information indicating that a user input is received on the display 630. The information related to the user input may include, for example, and without limitation, at least one of the position at which a user input is received (e.g., coordinates on the display 630), the number of areas where user inputs are received, the size of the area, the shape of the area, the magnitude of the pressure corresponding to a user input in the case where the display 630 is able to detect pressure, or the like.

According to various embodiments, the memory 610 may be operatively connected to the processor 620, and may store instructions that, when executed, cause the processor 620 to perform various operations including, for example, control of overall operations of the electronic device 200. The processor 620 may include various processing circuitry and perform various operations using instructions stored in the memory 610.

According to various embodiments, the processor 620 may include various processing circuitry and detect the occurrence of an event for changing an angle between a first housing structure (e.g., the first housing structure 210 in FIG. 5A) and a second housing structure (e.g., the second housing structure 220 in FIG. 5A).

According to various embodiments, the processor 620 may be operatively connected to a sensor (not shown) that measures an angle between the first housing structure 210 and the second housing structure 220 (e.g., the angle 521 in FIG. 5C). The processor 620 may detect the occurrence of an event of changing the angle between the first housing structure 210 and the second housing structure 220, based on data received from the sensor measuring the angle.

According to various embodiments, the processor 620 may detect the occurrence of an event of changing the angle between the first housing structure 210 and the second housing structure 220 using at least one sensor (e.g., a Hall sensor) capable of identifying the folding state of the electronic device 200 (a folded state of the electronic device 200 or an unfolded state of the electronic device 200)

According to various embodiments, the processor 620 may receive a touch interrupt produced according to a user input on the display 630. The user input on the display 630 may be a user input received while the angle between the first housing structure 210 and the second housing structure 220 is changing (or while the electronic device 200 is being folded or unfolded), or may be, if the angle between the first housing structure 210 and the second housing structure 220 changes within a predetermined time after receiving a user input, the received user input. In response to the reception of the user input, the touch controller 631 may produce a touch interrupt corresponding to the user input, and may transmit the produced touch interrupt to the processor 620. The touch interrupt may denote data including raw data for input by any of various external objects on the display 630.

According to various embodiments, the processor 620 may identify the characteristics of a user input in response to detecting the occurrence of an event of changing an angle between the first housing structure 210 and the second housing structure 220. The processor 620 may identify the characteristics of a user input using information related to the user input, which is transmitted by the touch controller 631. The information related to the user input may include a variety of information including, for example, and without limitation, the position at which a user input is received (e.g., coordinates on the display 630), the number of areas where user inputs are received, the size of the area, the shape of the area, the magnitude of the pressure corresponding to a user input in the case where the display 630 is able to detect pressure, or the like.

According to various embodiments, the processor 620 may identify the characteristics of a user input in response to determining that the angle between the first housing structure 210 and the second housing structure 220 falls within a predetermined range. For example, the processor 620 may identify the characteristics of a user input in response to determining that the angle between the first housing structure 210 and the second housing structure 220 is between 30 degrees and 150 degrees.

According to various embodiments, the processor 620 may determine whether to cancel a touch event corresponding to a user input, based on the characteristics of the user input. The touch event may be an event in which the processor 620 identifies data corresponding to a user input, among raw data included in the touch interrupt, and performs an operation corresponding to the user input (e.g., "action_down", "action_move", "action_up", "onTouch", etc.). The processor 620 may identify whether the characteristics of a user input satisfy predetermined conditions, and may determine to cancel a touch event corresponding to the user input if the characteristics of the user input satisfy the predetermined conditions. The cancelling the touch event may include, for example, and without limitation, at least one of cancelling the occurrence of the touch event, cancelling the execution of an operation to be executed to correspond to the user input, cancelling the execution of the operation that is being executed, or the like. For example, if a user input is received in the state in which a specific application is executed and displayed on the display 630 and in which a user interface related to the application is displayed, the processor 620 may not perform various operations corresponding to the user input (e.g., executing a specific menu or displaying a specific graphical user interface (GUI)), thereby cancelling the touch event. In this example, even if the processor 620 receives a user input, the user interface displayed on the display 630 may not change. According to various embodiments, the predetermined conditions may denote various conditions capable of identifying whether a user input is caused by change of the angle between the first housing structure 210 and the second housing structure 220. For example, the predetermined conditions may include, for example, and without limitation, at least one of whether the size of the area in which a user input is received is greater than or equal to a predetermined size, whether the number of areas in which user inputs are received is more than or equal to a predetermined number, whether the shape of the area in which a user input is received is a predetermined shape (such as a variety of shapes other than fingers, a shape of thumb, or a shape of palm), whether the pressure corresponding to a user input is a predetermined pressure, or the like. The predetermined conditions may be changed according to the intention of the designer of the electronic device 200.

According to various embodiments, the processor 620 may identify the characteristics of a user input received during an event of changing an angle between the first housing structure 210 and the second housing structure 220, and may determine whether the characteristics of the user input satisfy predetermined conditions. In response to determining that the characteristics of the user input satisfy the predetermined conditions, the processor 620 may cancel the touch event corresponding to the user input.

According to another embodiment, if the processor 620 receives a user input during an event of changing the angle between the first housing structure 210 and the second housing structure 220, the processor 620 may cancel the touch event corresponding to the user input, regardless of the characteristics of the user input.

According to various embodiments, the processor 620 may perform an operation of cancelling the touch event in a manner in which at least one of elements included in a framework implemented in the electronic device 200 (e.g., an input manager 725 in FIG. 7 or a window manager 723 in FIG. 7) cancels the operation corresponding to the touch event. Various embodiments of the above operation will be described in greater detail below with reference to FIGS. 7A and 7B.

According to various embodiments, the processor 620 may control the touch controller 631 to not produce a touch interrupt corresponding to a user input in response to determining that the characteristics of the user input satisfy predetermined conditions. The processor 620 may identify the amount of change in the angle between the first housing structure 210 and the second housing structure 220, and, if the amount of change in the angle is equal to or greater than (or exceeds) a predetermined value, may control the touch controller 631 to not produce a touch interrupt corresponding to the user input. In the case where the touch controller 631 does not produce a touch interrupt, the touch controller 631 may not process a user input even if the user input is received, and data related to the user input may not be transmitted to the processor 620. Since the touch controller 631 does not produce a touch interrupt, the processor 620 may ignore the user input. Various embodiments of the above operation will be described in greater detail below with reference to FIG. 7C.

According to various embodiments, the processor 620 may determine that the characteristics of a user input satisfy predetermined conditions, and may control an input manager 725 included in the framework implemented in the electronic device 200, thereby controlling the touch controller 631 to not produce a touch interrupt corresponding to the user input while performing an operation of cancelling the touch event. As a result of the operation described above, the processor 620 may cancel the touch event corresponding to the user input received before the amount of change in the angle between the first housing structure 210 and the second housing structure 220 exceeds a predetermined value by controlling the input manager 725, and may ignore the user input received after the amount of change in the angle between the first housing structure 210 and the second housing structure 220 exceeds a predetermined value by controlling the touch controller 631.

According to various embodiments, the processor 620 may control the touch controller 631 to change a sampling rate for detecting a user input in response to detecting the occurrence of an event of changing the angle between the first housing structure 210 and the second housing structure 220. The touch controller 631 may identify physical properties measured by a touch sensor at a predetermined interval (sampling rate) from the touch sensor. As the sampling rate increases, the accuracy of sensing user input may increase. If the sampling rate is reduced, the accuracy of sensing user input is lowered, but the power required to detect user input may be reduced. The processor 620 may reduce the sampling rate in response to detecting the occurrence of an event of changing the angle between the first housing structure 210 and the second housing structure 220. For example, the processor 620 may reduce the sampling rate, based on an angle measurement period of the sensor measuring the angle between the first housing structure 210 and the second housing structure 220. By reducing the sampling rate, the processor 620 may reduce the number of operations for identifying whether the user input is an unintended user input, thereby reducing the probability of malfunction caused by the unintended user input. The processor 620 may restore the reduced sampling rate to the original sampling rate in response to detecting that the occurrence of an event of changing the angle between the first housing structure 210 and the second housing structure 220 is terminated.

According to various embodiments, the processor 620 may identify that the change in the angle between the first housing structure 210 and the second housing structure 220 is terminated, and may process a touch event corresponding to a user input received after the change of the angle is terminated. For example, if the processor 620 identifies that the change in the angle between the first housing structure 210 and the second housing structure 220 is terminated, the processor 620 may control the input manager 725 such that a touch input controller performs an operation corresponding to the touch event. As another example, if the processor 620 identifies that the change in the angle between the first housing structure 210 and the second housing structure 220 is terminated, the processor 620 may control the touch controller 631 to produce a touch interrupt again.

According to various embodiments, although the operation illustrated in FIG. 6 has been described on the assumption that the electronic device 200 is folded in an in-folding manner (a manner in which the first housing structure 210 and the second housing structure 220 are folded in a counterclockwise direction), the operation may also be applied to an out-folding manner (a manner in which the first housing structure 210 and the second housing structure 220 are folded in a clockwise direction). According to various embodiments, the display 630 described in FIG. 6 may be one of either the first display 530 or the second display 540. If the display 630 is the first display 530, the touch controller 631 may be a touch controller connected to the first display 530. In this example, although not shown, the electronic device 200 may further include a second display 540 and a touch controller connected to the second display 540. According to another embodiment, if the display 630 is the second display 540, the touch controller 631 may be a touch controller connected to the second display 540.

According to various embodiments, if the angle between the first housing structure 210 and the second housing structure 220 does not change for a predetermined time or more, the sampling rate for the area corresponding to the folding axis (e.g., the folding axis 520 in FIG. 5E) of the area of the display 630 may be adjusted.

According to various embodiments, the processor 620 of the electronic device 600 implemented in the in-folding type may reduce the sampling rate of a specific area of the display 630 (e.g., the area corresponding to 520 in FIG. 5E) if the angle between the first housing structure 210 and the second housing structure 220 falls within a specific range (e.g., 30 degrees to 150 degrees), and if the angle does not change for a predetermined time or more.

According to various embodiments, the processor 620 of the electronic device 600 implemented in the out-folding type may increase the sampling rate of a specific area of the display 630 (e.g., the area corresponding to 520 in FIG. 5E) if the angle between the first housing structure 210 and the second housing structure 220 falls within a specific range (e.g., 30 degrees to 150 degrees), and if the angle does not change for a predetermined time or more.

Figure 7A:
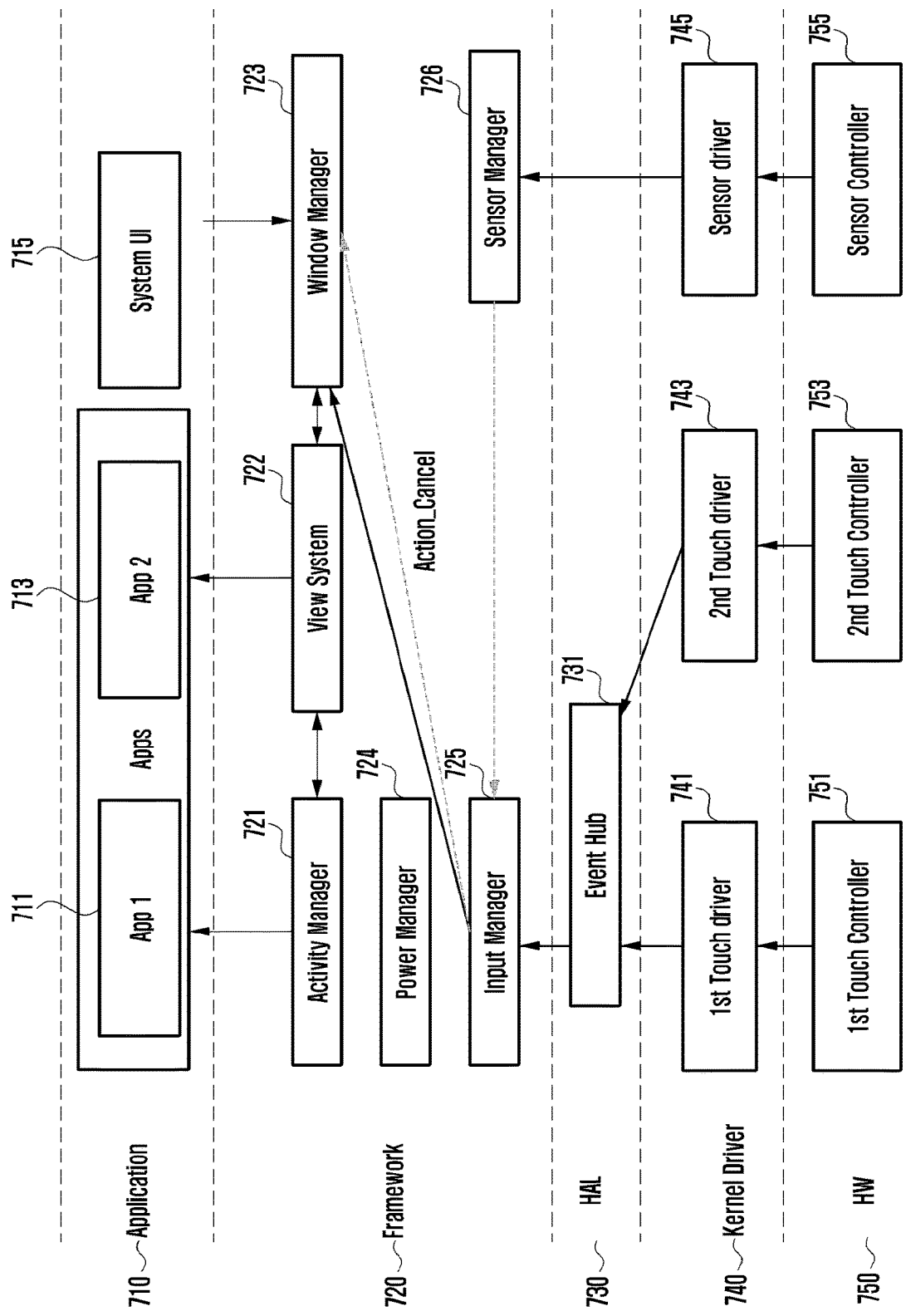
FIG. 7A is a diagram illustrating an example of reducing occurrence of an unintended user input in an electronic device according to various embodiments.
Figure 7B:
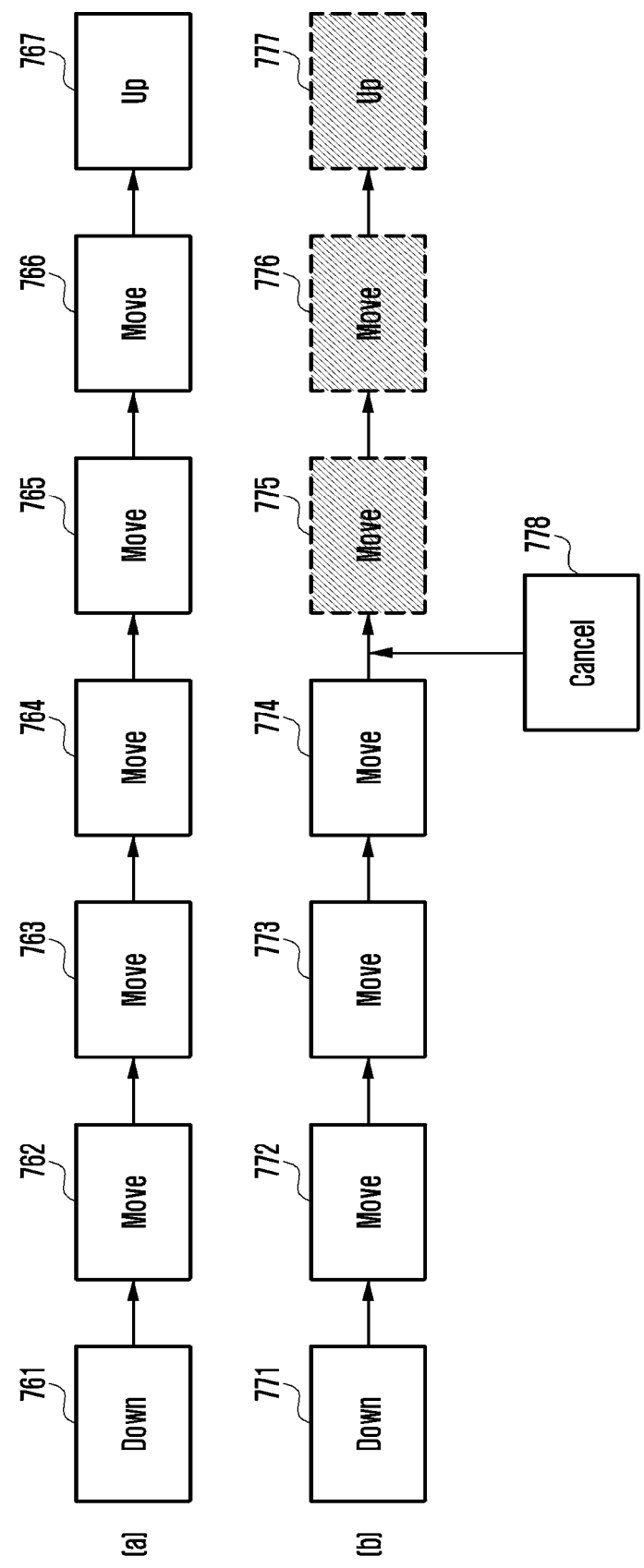
FIG. 7B is a diagram illustrating an example of reducing an occurrence of an unintended user input in an electronic device according to various embodiments.

FIG. 7A is a diagram illustrating an example of preventing and/or reducing an occurrence of an unintended user input in an electronic device according to various embodiments, FIG. 7B is a diagram illustrating an example of preventing and/or reducing an occurrence of an unintended user input in an electronic device according to various embodiments, and FIG. 7C is a diagram illustrating an example of preventing and/or reducing an occurrence of an unintended user input in an electronic device according to various embodiments.

FIG. 7A illustrates an embodiment in which an electronic device (e.g., the electronic device 200 in FIG. 2A) cancels a touch event to reduce an occurrence of and/or prevent an unintended user input, according to various embodiments.

FIG. 7A illustrates a hierarchy of elements that are implemented in software in the electronic device 200 according to various embodiments.

According to various embodiments, an application layer 710 may include applications (App 1 (711) and App 2 (713)) (e.g., the application 146 in FIG. 4) installed in a memory (e.g., the memory 610 in FIG. 6) and a system user interface (UI) 715. The system UI 715 may refer, for example, to an application for displaying a screen related to a system (e.g., a notification bar or a quick view).

According to various embodiments, a framework layer 720 may provide the applications 711 and 713 with various functions such that the applications 711 and 713 are able to use functions or information provided from one or more resources of the electronic device 200. The framework 720 may include an activity manager 721 (e.g., the application manager 401 in FIG. 4) for managing the life cycle of the application 711 or 713, a view system 722 that may be a set of extensible views used to produce a user interface of an application, a window manager 723 for managing one or more GUI resources to be displayed, a power manager 724 that manages a battery of the electronic device 200 (e.g., the battery 189 in FIG. 1), an input manager 725 that provides information on input means (e.g., the display 630 in FIG. 6) provided by the electronic device 200, and a sensor manager 726 that controls a sensor (e.g., the sensor in FIG. 1 (e.g., the sensor module 176 in FIG. 1)).

According to various embodiments, a hardware abstraction layer (HAL) 730 may indicate an abstracted layer between a plurality of hardware modules included in the hardware layer 750 and software of the electronic device 200. The hardware abstraction layer 730 may include an event hub 731 that provides an interface for standardizing events occurring in the touch controller 751 or the sensor 176.

According to various embodiments, a kernel driver layer 740 may include various drivers for controlling various hardware modules included in the electronic device 200. The kernel driver layer 740 may include a first touch driver 741 for controlling a first touch controller 751 included in a first display (e.g., the first display 530 in FIG. 5A), a second touch driver 743 for controlling a second touch controller 753 included in a second display (e.g., the second display 540 in FIG. 5B), and a sensor driver 745 for controlling a sensor controller 755 operatively connected to the sensor 176.

According to various embodiments, the hardware layer 750 may refer, for example, to a variety of hardware included in the electronic device 200. The hardware layer 750 may include: a first touch controller 751 (e.g., the touch controller 631 in FIG. 6) that receives a user input on the first display 530, produces an interrupt corresponding to the user input, and transmits information related to the user input and the interrupt to the processor (e.g., the processor 620 in FIG. 6); a second touch controller 753 (e.g., the touch controller 631 in FIG. 6) that receives a user input on the second display 540, produces an interrupt corresponding to the user input, and transmits information related to the user input and the interrupt to the processor 620; and a sensor controller 755 that transmits the information collected by the sensor (e.g., information on the angle between the first housing structure 211 and the second housing structure 221) to the processor 620.

According to various embodiments, the first touch controller 753 may receive a user input on the first display 530, may produce a touch interrupt including information indicating that the user input has been received and information related to the user input, and may transmit the same to the event hub 731 through an interface provided by the first touch driver 741. The event hub 731 may process the touch interrupt and the information related to the user input, and may transmit the processed information to the input manager 725. The event hub 731 may receive a touch interrupt transmitted from the first touch driver 741 or the second touch driver 743, and may transmit the received touch interrupt to the input manager 725. The input manager 725 may process the information received from the event hub 731, and may then transmit the processed information to the window manager 723. The window manager 723 may control the view system 722 so as to display a function corresponding to the user input under the control of the input manager 725.

According to various embodiments, the sensor controller 755 may receive information on the angle between the first housing structure 212 and the second housing structure 222 from a sensor connected to the sensor controller 755. The sensor controller 755 may transmit the angle information to the sensor manager 726 through an interface provided by the sensor driver 745. The sensor manager 726 may transmit the received angle information to various elements.

According to various embodiments, the sensor manager 726 may transmit the received angle information to the input manager 725. The input manager 725 may detect the occurrence of an event of changing the angle between the first housing structure 210 and the second housing structure 220, based on the angle information transmitted by the sensor manager 726. The input manager 725 may identify the characteristics of a user input, based on the information related to the user input transmitted by the event hub 731, in response to detecting the occurrence of an event of changing the angle between the first housing structure 210 and the second housing structure 220. The input manager 725 may identify the characteristics of the user input, and determine whether the characteristics of the user input satisfy predetermined conditions.

According to various embodiments, the predetermined conditions may denote various conditions for identifying whether the user input is produced by change of the angle between the first housing structure 210 and the second housing structure 220. For example, the predetermined conditions may include at least one of whether the size of the area in which a user input is received is greater than or equal to a predetermined size, whether the number of areas in which user inputs are received is greater than or equal to a predetermined number, whether the shape of the area in which a user input is received is a predetermined shape (such as a variety of shapes other than fingers, a shape of thumb, or a shape of palm), and whether the pressure corresponding to a user input is a predetermined pressure. The predetermined conditions may be changed according to the intention of the designer of the electronic device 200.

According to various embodiments, the input manager 725 may control the window manager 723 to cancel a touch event corresponding to a user input in response to determining whether the characteristics of the user input satisfy predetermined conditions. The input manager 725 may cancel a touch event by transmitting a command to cancel the touch event (e.g., "Action_cancel") to the window manager 723. Various embodiments of cancelling a touch event will be described in greater detail below with reference to FIG. 7B.

FIG. 7B is a diagram illustrating various examples for cancelling a touch event corresponding to a user input according to various embodiments.

Various embodiments illustrated in FIG. 7B will be described with reference to the configuration shown in FIG. 7A.

FIG. 7B illustrates an example processing flow of a touch event (see (a) of FIG. 7B). The touch event may include a "down" 761 indicating the start of a touch event at a start point, a "move" 762, 763, 764, 765, or 766 indicating the event in which the touched portion moves from the start point, and an "up" 767 indicating the end of a touch event at an end point. The window manager 723 may receive a touch event from the input manager 725, and may control the applications 711 and 712 to execute a function corresponding to the touch event.

According to various embodiments, the input manager 725 may receive an interrupt and information related to a user input transmitted by the event hub 731, may produce a touch event, based on the information related to the user input, and transmit the same to the window manager 723. The window manager 723 may receive a touch event from the input manager 725, and may process the touch event corresponding to the user input. For example, the window manager 723 may receive an up 767 indicating the end of a touch event, and may control the application 711 so as to perform an operation corresponding to the touch event (e.g., executing a specific menu).

According to various embodiments, the input manager 725 may receive an interrupt and information related to a user input transmitted by the event hub 731, may transmit a produced touch event to the window manager 723, and may then receive information on the angle between the first housing structure 210 and the second housing structure 220 from the sensor manager 726. The input manager 725 may detect the occurrence of an event of changing the angle between the first housing structure 210 and the second housing structure 220, based on the angle information. The input manager 725 may identify the characteristics of the user input using the information related to the user input transmitted by the touch controller 631 in response to the occurrence of the event of changing the angle, and may determine whether to cancel the touch event corresponding to the user input based on the characteristics of the user input. In response to the decision to cancel the touch event, the input manager 725 may produce an event for cancelling the processing of the touch event, and may transmit the produced cancellation event to the window manager 723.

Referring to FIG. 7B, a touch event may include a "down" 771 indicating the start of a touch event at a start point, "moves" 772, 773, 774, 775, and 776 indicating events in which a contact portion moves from the start point, and an "up" 777 indicating the end of a touch event at an end point (see (b) of FIG. 7B). The window manager 723 may process the touch events 771, 772, 773, and 774 received before receiving the cancellation event 778, and may not process the touch events 775, 776, and 777 received after receiving the cancellation event 778. For example, the window manager 723 may process an event (e.g., the down 771) received before receiving the cancellation event 778 so that the application 711 executes an operation corresponding thereto (e.g., displaying a selection GUI of a specific menu). The window manager 723 may cancel the event (e.g., the up 777) received after receiving the cancellation event 778 so that the application 711 does not perform an unintended operation (e.g., execution of a selected menu).

FIG. 7C is a diagram illustrating an example in which an electronic device (e.g., the electronic device 200 in FIG. 2A) prevents the production of a touch interrupt, thereby preventing and/or reducing an occurrence of an unintended user input, according to various embodiments.

FIG. 7C illustrates the hierarchy of components that are implemented in software in the electronic device 200 according to various embodiments. Elements shown in FIG. 7C, which are the same as the elements illustrated in FIG. 7A, may not be repeated for clarity.

According to various embodiments, the sensor controller 755 may receive information on the angle between the first housing structure 212 and the second housing structure 222 from a sensor connected to the sensor controller 755. The sensor controller 755 may transmit angle information to the sensor manager 726 through an interface provided by the sensor driver 745. The sensor manager 726 may transmit the received angle information to various elements.

According to various embodiments, the sensor manager 726 may transmit the received angle information to the first touch controller 751 through an interface provided by the first touch driver 741. The first touch controller 751 may detect the occurrence of an event of changing the angle between the first housing structure 210 and the second housing structure 220, based on the angle information transmitted by the sensor manager 726. In response to determining that the amount of change in the angle between the first housing structure 210 and the second housing structure 220 is equal to or greater than a predetermined value, the first touch controller 751 may identify the characteristics of the user input, based on information related to the user input. The first touch controller 751 may identify the characteristics of the user input, and may determine whether the characteristics of the user input satisfy predetermined conditions.

According to various embodiments, the predetermined conditions may refer, for example, to various conditions for identifying whether the user input is produced by change of the angle between the first housing structure 210 and the second housing structure 220. For example, the predetermined conditions may include at least one of whether the size of the area in which a user input is received is greater than or equal to a predetermined size, whether the number of areas in which user inputs are received is greater than or equal to a predetermined number, whether the shape of the area in which a user input is received is a predetermined shape (such as a variety of shapes other than fingers, a shape of thumb, or a shape of palm), and whether the pressure corresponding to a user input is a predetermined pressure. The predetermined conditions may be changed according to the intention of the designer of the electronic device 200.

According to various embodiments, the first touch controller 751 may not produce a touch interrupt corresponding to the user input in response to determining that the characteristics of the user input satisfy predetermined conditions. In the example where the first touch controller 751 does not produce a touch interrupt, even if the first touch controller 751 receives a user input, data related to the user input may not be transmitted to the processor 620. Through the operation described above, it is possible to prevent and/or reduce the processing of the user input unintended by the user (or to ignore the user input). In this case, the state of the display (e.g., the state of the display 630 in FIG. 6 (e.g., an inactive state)) or a user interface displayed on the display 630 may not change.

According to various embodiments, the first touch controller 751 may be operatively connected to a sensor that measures an angle between the first housing structure 210 and the second housing structure 220. If the first touch controller 751 is operatively connected to the sensor, the first touch controller 751 may determine whether to produce a touch interrupt, based on the information transmitted by the sensor, without intervention of the processor 620.

According to various embodiments, although it has been described that the first touch controller 751 identifies the characteristics of the user input, the input manager 725 rather than the first touch controller 751 may identify the characteristics of the user input, and may control the first touch driver 741 and the first touch controller 751, based on the identified result.

Although the embodiments of preventing and/or reducing an unintended user input have been described based on a user input on the first display 530 in FIGS. 7A, 7B and 7C, the embodiments may also be applied to a user input on the second display 540. For example, the second touch controller 753 may identify the characteristics of a user input, and may determine whether the characteristics of the user input satisfy predetermined conditions. The second touch controller 753 may not produce a touch interrupt corresponding to the user input in response to determining that the characteristics of the user input satisfy predetermined conditions.

An electronic device according to various example embodiments may include: a foldable housing including a hinge, a first housing connected to the hinge and including a first surface facing a first direction and a second surface facing a second direction opposite the first direction, and a second housing connected to the hinge and including a third surface facing a third direction and a fourth surface facing a fourth direction opposite the third direction, the second housing configured to be foldable with respect to the first housing about the hinge, wherein the first surface faces the third surface in a folded state; a display extending from the first surface to the third surface to provide the first surface and the third surface and including a touch controller configured to control a receiving function of an input on the display; a processor disposed inside the first or second housing and operatively coupled to the display; and a memory operatively connected to the processor, wherein the memory stores instructions that, when executed, cause the processor to control the electronic device to: detect the occurrence of changing an angle between the first housing and the second housing; receive a touch interrupt produced based on an input received on the display; identify characteristics of the input in response to detecting the change in the angle; and determine whether to cancel the touch event corresponding to the input based on the characteristics of the input.

In the electronic device according to various example embodiments, the memory may store instructions that, when executed, cause the processor to control the electronic device to: determine whether the input is produced due to the change of the angle between the first housing structure and the second housing structure; and cancel the touch event corresponding to the input based on the determination result.

In the electronic device according to various example embodiments, the memory may store instructions that, when executed, cause the processor to control the electronic device to: process the touch event corresponding to the input received after the change of the angle is terminated in response to identifying that the change of the angle is terminated.

In the electronic device according to various example embodiments, the memory may store instructions that, when executed, cause the processor to control the electronic device to: control the touch controller to not produce an interrupt corresponding to the input based on the input being received, and in response to identifying that the amount of change in the angle is equal to or greater than a predetermined value.

The electronic device according to various example embodiments may further include a sensor configured to sense an angle between the first housing and the second housing, and the memory may store instructions that, when executed, cause the processor to control the sensor to transmit an angle event for the change in the angle to the processor or to the touch controller.

In the electronic device according to various example embodiments, the memory may store instructions that, when executed, cause the processor to control the electronic device to: control the touch controller to change a sampling rate for sensing the input in response to detecting the change in the angle.

In the electronic device according to various example embodiments, the memory may store instructions that, when executed, cause the processor to control the electronic device to: change the sampling rate of the touch controller based on a period in which a sensor for detecting an angle between the first housing structure and the second housing structure detects the angle.

An electronic device according to various example embodiments may include: a foldable housing including a hinge, a first housing connected to the hinge and including a first surface facing a first direction and a second surface facing a second direction opposite the first direction, and a second housing connected to the hinge structure, including a third surface facing a third direction and a fourth surface facing a fourth direction opposite the third direction, the second housing configured to be foldable with respect to the first housing about the hinge, wherein the first surface faces the third surface in a folded state; a first display extending from the first surface to the third surface to provide the first surface and the third surface and including a first touch controller configured to control a receiving function of an input on the display; a second display provided on the second surface or the fourth surface and including a second touch controller configured to control a receiving function of an input on the second display; a processor disposed inside the first or second housing and operatively coupled to the first display and the second display; and a memory operatively connected to the processor, wherein the memory may store instructions that, when executed, cause the processor to control the electronic device to: detect changing an angle between the first housing and the second housing; identify characteristics of the input in response to detecting the change in the angle; and determine whether to cancel the touch event corresponding to the input based on the characteristics of the user input.

In the electronic device according to various example embodiments, the memory may store instructions that, when executed, cause the processor to control the electronic device to: switch the first display to an inactive state and switch the second display to an active state in response to identifying that the change of the angle is terminated; and process a touch event corresponding to an input on the second display after the change of the angle is terminated.

In the electronic device according to various example embodiments, the memory may store instructions that, when executed, cause the processor to control the electronic device to: determine whether the input is produced due to the change of the angle between the first housing and the second housing; and cancel the touch event corresponding to the input based on the determination result.

In the electronic device according to various example embodiments, the memory may store instructions that, when executed, cause the processor to control the electronic device to: control the first touch controller to not produce an interrupt corresponding to the input based on receiving the input and in response to identifying that the amount of change in the angle is equal to or greater than a predetermined value.

In the electronic device according to various example embodiments, the memory may store instructions that, when executed, cause the processor to control the electronic device to: control the first touch controller to change a sampling rate for sensing the input in response to detecting the change in the angle.

In the electronic device according to various example embodiments, the memory may store instructions that, when executed, cause the processor to control the electronic device to: change the sampling rate of the first touch controller based on a period in which a sensor for detecting an angle between the first housing and the second housing detects the angle.

In the electronic device according to various example embodiments, the memory may store instructions that, when executed, cause the processor to control the electronic device to: receive a touch interrupt produced based on an input on the second display while the first display is in an inactive state and the second display is in an active state; detect whether an event of change in the angle between the first housing and the second housing occurs; and cancel the touch event corresponding to the input in response to detecting the change in the angle.

Figure 8:
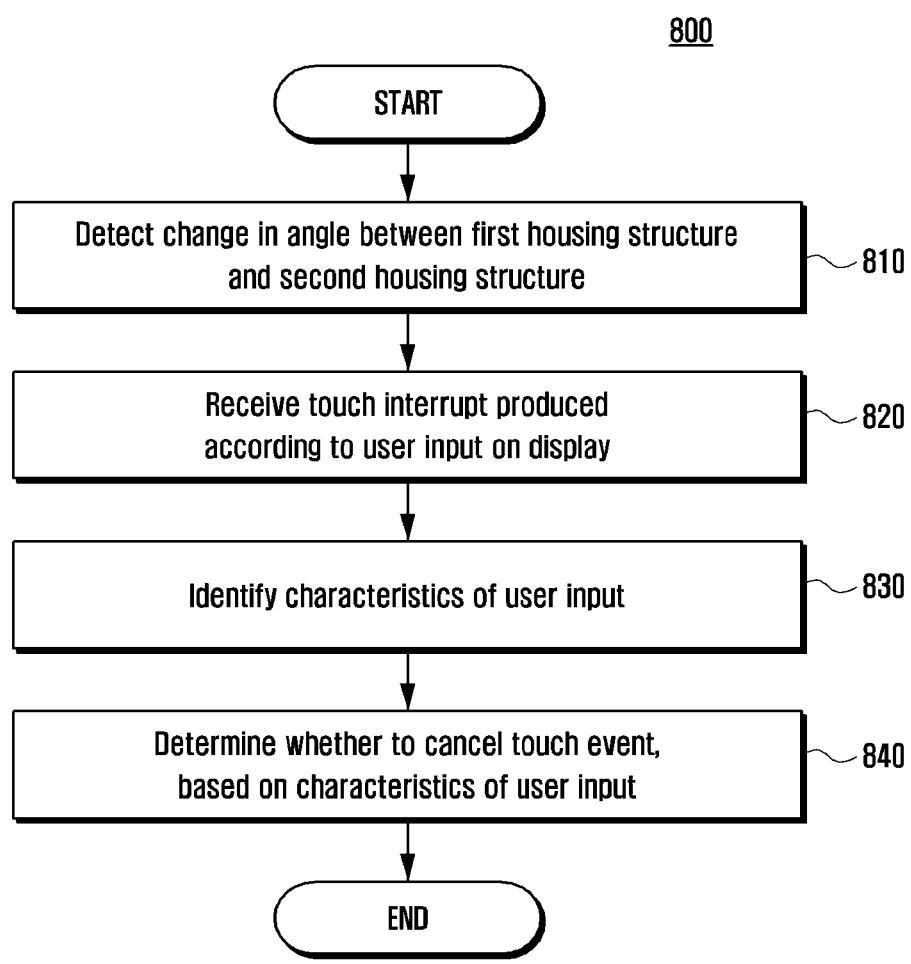
FIG. 8 is a flowchart illustrating an example method of operating an electronic device according to various embodiments.

FIG. 8 is a flowchart illustrating an example method 800 of operating an electronic device according to various embodiments.

According to various embodiments, in operation 810, an electronic device (e.g., the electronic device 200 in FIG. 2A) may detect the occurrence of an event of changing an angle between a first housing structure (e.g., the first housing structure 210 in FIG. 5A) and a second housing structure (e.g., the second housing structure 220 in FIG. 5A).

According to various embodiments, based on data received from a sensor (not shown) that measures an angle between the first housing structure 210 and the second housing structure 220 (e.g., the angle 521 in FIG. 5C), the electronic device 200 may detect the occurrence of an event of changing the angle between the first housing structure 210 and the second housing structure 220.

According to various embodiments, in operation 820, the electronic device 200 may receive a touch interrupt produced according to a user input on a display (e.g., the display 230 in FIG. 2A or the display 630 in FIG. 6).

According to various embodiments, the user input on the display 630 may be the user input received while the angle between the first housing structure 210 and the second housing structure 220 is changing (or while the electronic device 200 is being folded or unfolded). Alternatively, if an operation of folding or unfolding the electronic device 200 is detected within a predetermined time after receiving a user input, the user input on the display 630 may be the corresponding user input. In this case, operations 810 and 820 may be performed in different sequences. In response to the reception of the user input, a touch controller (e.g., the touch controller 631 in FIG. 6) may produce a touch interrupt corresponding to the user input, and may transmit the produced touch interrupt to a processor (e.g., the processor 620 in FIG. 6).

According to various embodiments, in operation 830, the electronic device 200 may identify the characteristics of a user input.

According to various embodiments, the electronic device 200 may identify the characteristics of a user input using information related to the user input transmitted by the touch controller 631. The information related to the user input may include at least one of the position at which a user input is received (e.g., coordinates on the display 630), the number of areas where user inputs are received, the size of the area, the shape of the area, and the magnitude of the pressure corresponding to a user input in the case where the display 630 is able to detect pressure.

According to various embodiments, in operation 840, the electronic device 200 may determine whether to cancel the touch event, based on the characteristics of the user input.

According to various embodiments, the electronic device 200 may determine whether to cancel the touch event corresponding to the user input, based on the characteristics of the user input. The electronic device 200 may determine whether the characteristics of the user input satisfy predetermined conditions, and may determine to cancel the touch event corresponding to the user input in response to determining that the characteristics of the user input satisfy the predetermined conditions. The cancelling of the touch event may include at least one of cancelling the occurrence of the touch event, cancelling the execution of an operation to be executed to correspond to the user input, or cancelling the execution of the operation that is being executed. For example, if a user input is received in the state in which a specific application is executed, the electronic device 200 may not perform various operations corresponding to the user input (e.g., executing a specific menu or displaying a specific GUI), or may cancel the operation that is being performed, thereby cancelling the touch event.

According to various embodiments, the predetermined conditions may refer, for example, to various conditions capable of identifying whether a user input is caused by an angle change between the first housing structure 210 and the second housing structure 220. For example, the predetermined conditions may include at least one of whether the size of the area in which a user input is received is greater than or equal to a predetermined size, whether the number of areas in which user inputs are received is greater than or equal to a predetermined number, whether the shape of the area in which a user input is received is a predetermined shape (such as a variety of shapes other than fingers, a shape of thumb, or a shape of palm), and whether the pressure corresponding to a user input is a predetermined pressure. The predetermined conditions may be changed according to the intention of the designer of the electronic device 200.

Figure 9:
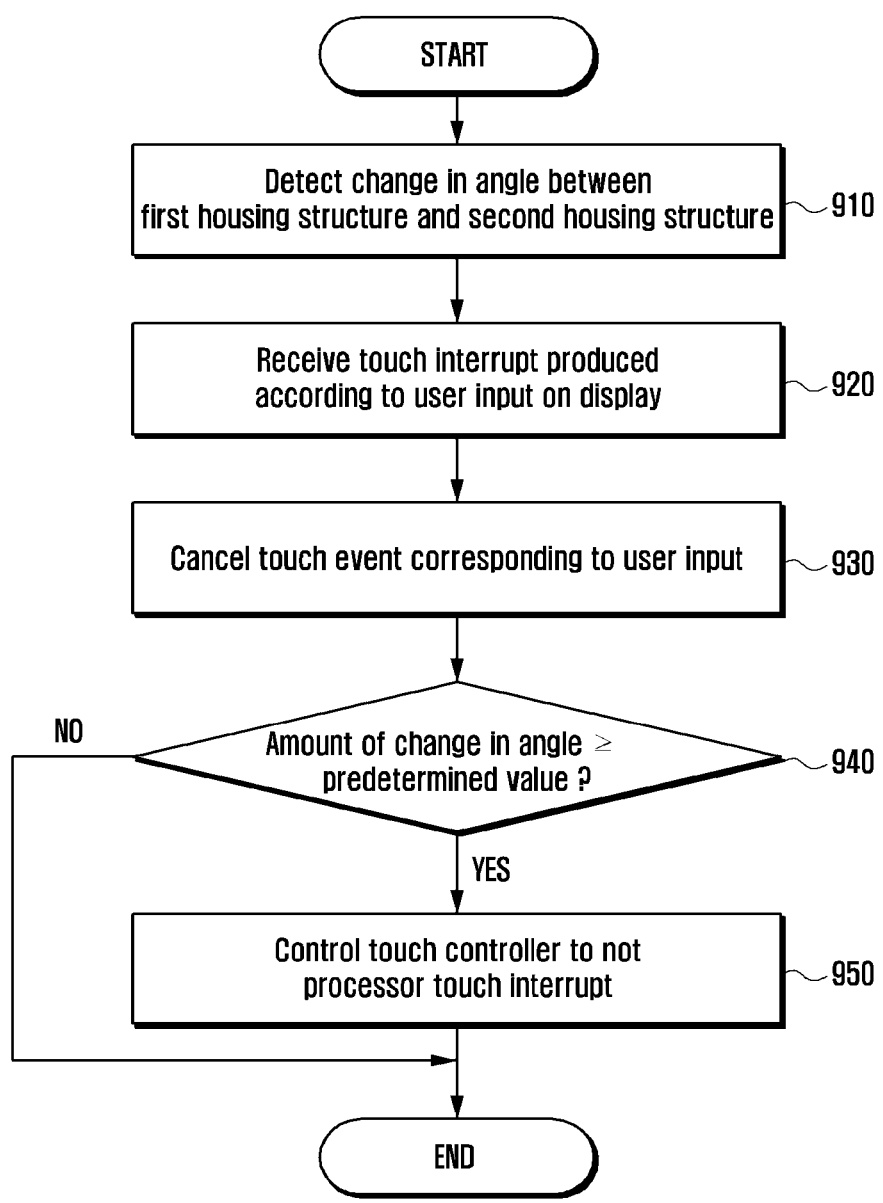
FIG. 9 is a flowchart illustrating an example method of operating an electronic device according to various embodiments.

FIG. 9 is a flowchart illustrating an example method 900 of operating an electronic device according to various embodiments.

According to various embodiments, in operation 910, an electronic device (e.g., the electronic device 200 in FIG. 2A) may detect the occurrence of an event of changing an angle between a first housing structure (e.g., the first housing structure 210 in FIG. 5A) and a second housing structure (e.g., the second housing structure 220 in FIG. 5A).

According to various embodiments, based on data received from a sensor (not shown) that measures an angle between the first housing structure 210 and the second housing structure 220 (e.g., the angle 521 in FIG. 5C), the electronic device 200 may detect the occurrence of an event of changing the angle between the first housing structure 210 and the second housing structure 220.

According to various embodiments, in operation 920, the electronic device 200 may receive a touch interrupt produced according to a user input on a display (e.g., the display 230 in FIG. 2A or the display 630 in FIG. 6).

According to various embodiments, the user input on the display 630 may be the user input received while the angle between the first housing structure 210 and the second housing structure 220 is changing (or while the electronic device 200 is being folded or unfolded). In response to the reception of the user input, a touch controller (e.g., the touch controller 631 in FIG. 6) may produce a touch interrupt corresponding to the user input, and may transmit the produced touch interrupt to a processor (e.g., the processor 620 in FIG. 6).

According to various embodiments, in operation 930, the electronic device 200 may cancel the touch event corresponding to the user input.

According to various embodiments, the processor 620 may identify the characteristics of the user input, based on information related to the user input transmitted by the touch controller 631, and may determine whether to cancel the touch event, based on the characteristics of the user input. The electronic device 200 may determine whether the characteristics of the user input satisfy predetermined conditions, and may determine to cancel the touch event corresponding to the user input in response to determining that the characteristics of the user input satisfy the predetermined conditions. The cancelling of the touch event may include at least one of cancelling the occurrence of the touch event, cancelling the execution of an operation to be executed to correspond to the user input, or cancelling the execution of the operation that is being executed.

According to various embodiments, in operation 940, the electronic device 200 may determine whether the amount of change in the angle between the first housing structure 210 and the second housing structure 220 exceeds a predetermined value. If the amount of change in the angle exceeds a predetermined value ("YES"), the electronic device 200 may perform operation 950. If the amount of change in the angle does not exceed a predetermined value ("NO"), the electronic device 200 may end the operation shown in FIG. 9.

According to various embodiments, in operation 950, the electronic device 200 may control the touch controller 631 to not produce a touch interrupt.

According to various embodiments, in the case where the touch controller 631 does not produce a touch interrupt, the touch controller 631 may not process a user input even though the touch controller 631 receives the user input, and the data related to the user input may not be transmitted to the processor 620. Through the operations described above, the electronic device 200 may cancel the touch event corresponding to the user input.

Figure 10:
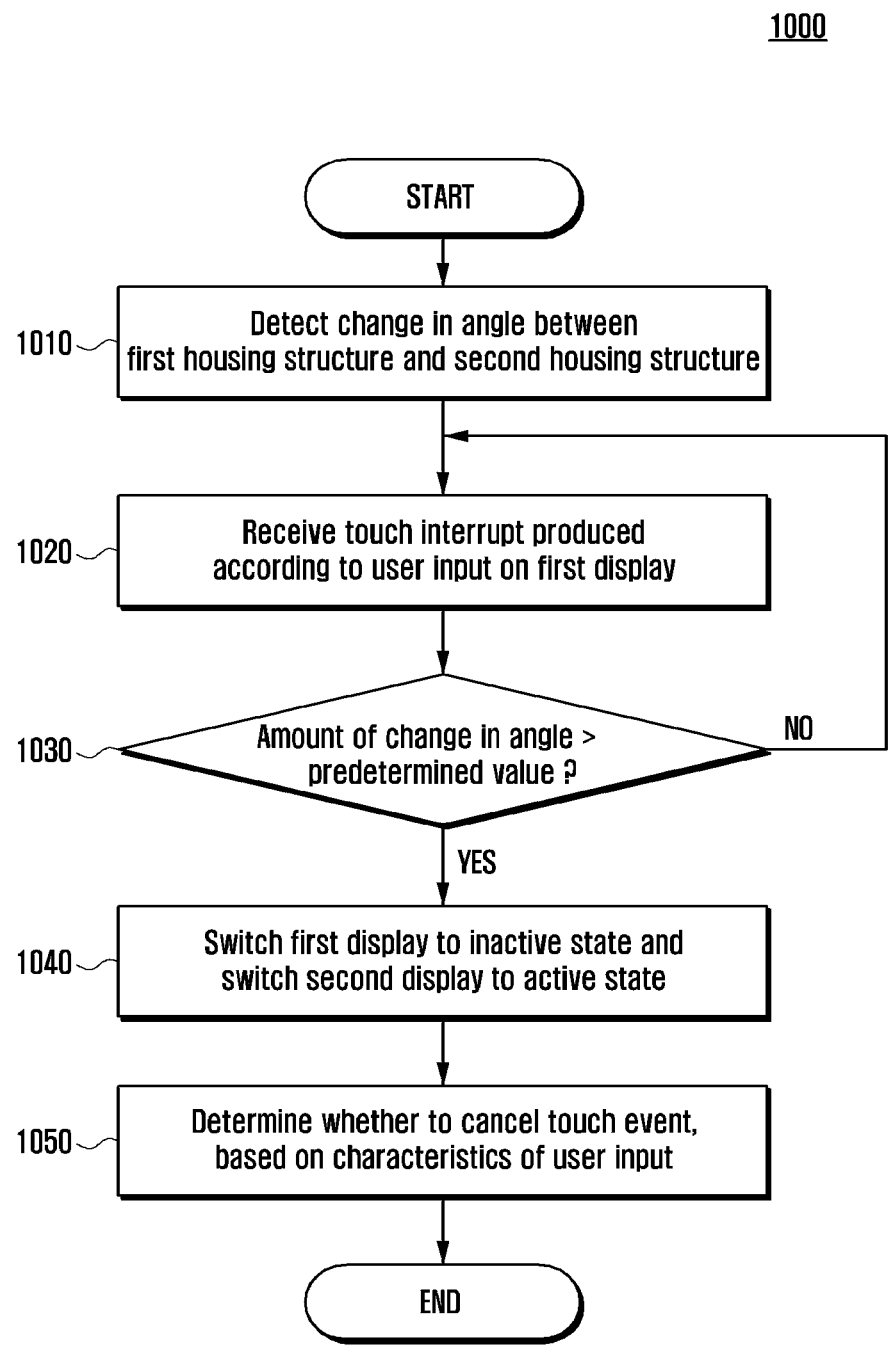
FIG. 10 is a flowchart illustrating an example method of operating an electronic device according to various embodiments.

FIG. 10 is a flowchart illustrating an example method 1000 of operating an electronic device according to various embodiments.

According to various embodiments, in operation 1010, an electronic device (e.g., the electronic device 200 in FIG. 2A) may detect the occurrence of an event of changing the angle between a first housing structure (e.g., the first housing structure 210 in FIG. 5A) and a second housing structure (e.g., the second housing structure 220 in FIG. 5A).

According to various embodiments, the electronic device 200 may include a sensor for measuring the angle between the first housing structure 210 and the second housing structure 220 (e.g., the angle 521 in FIG. 5C). The sensor may identify the angle between the first housing structure 210 and the second housing structure 220, and may transmit the identified value to the processor 620. The processor 620 may detect the occurrence of an event of changing the angle between the first housing structure 210 and the second housing structure 220, based on the identified value.

According to various embodiments, in operation 1020, the electronic device 200 may receive a touch interrupt produced according to a user input on a first display (e.g., the display 230 in FIG. 2A or the first display 530 in FIG. 5A).

According to various embodiments, the user input on the first display 530 may be a user input received while the angle between the first housing structure 210 and the second housing structure 220 changes (or while the electronic device 200 is being folded or unfolded). In response to the reception of the user input, a touch controller (e.g., the touch controller 631 in FIG. 6) may produce a touch interrupt corresponding to the user input, and may transmit the produced touch interrupt to the processor (e.g., the processor 620 in FIG. 6). The processor 620 may receive a touch interrupt, may identify data corresponding to a user input among row data included in the touch interrupt, and may produce a touch event for performing an operation corresponding to the user input.

According to various embodiments, in operation 1030, the electronic device 200 may determine whether the amount of change in the angle between the first housing structure 210 and the second housing structure 220 exceeds a predetermined value. If the amount of change in the angle exceeds a predetermined value, the electronic device 200 may perform operation 1040. If the amount of change in the angle does not exceed a predetermined value, the electronic device 200 may perform operation 1020.

According to various embodiments, in operation 1040, in response to determining that the amount of change in the angle between the first housing structure 210 and the second housing structure 220 exceeds a predetermined value, the electronic device 200 may switch the first display 530 from an active state to an inactive state, and may switch the second display 540 from an inactive state to an active state.

According to various embodiments, in operation 1050, the electronic device 200 may determine whether to cancel the touch event, based on the characteristics of the user input.

According to various embodiments, the processor 620 may identify the characteristics of the user input, based on information related to the user input transmitted by the touch controller 631, and may determine whether to cancel the touch event, based on the characteristics of the user input.

A method of operating an electronic device according to various example embodiments may include: detecting whether an event of changing an angle between a first housing, which is connected to a hinge and includes a first surface facing a first direction and a second surface facing a second direction opposite the first direction, and a second housing, which is connected to the hinge, and includes a third surface facing a third direction and a fourth surface facing a fourth direction opposite the third direction, and the second housing is configured to be foldable with respect to the first housing about the hinge structure, occurs; receiving a touch interrupt produced based on an input on a display; identifying the characteristics of the input in response to detecting the change in the angle; and determining whether to cancel the touch event corresponding to the input based on the characteristics of the user input.

The method of operating an electronic device according to various example embodiments may further include: determining whether the input is produced due to the change of the angle between the first housing and the second housing; and cancelling the touch event corresponding to the input based on the determination result.

The method of operating an electronic device according to various example embodiments may further include, controlling a touch controller to not produce an interrupt corresponding to the input based on the input being received and in response to identifying that the amount of change in the angle is equal to or greater than a predetermined value.

The method of operating an electronic device according to various example embodiments may further include transmitting an angle event for the change in the angle to a processor or the touch controller by a sensor configured to detect an angle between the first housing and the second housing.

The method of operating an electronic device according to various example embodiments may further include controlling the touch controller to change a sampling rate for sensing the input in response to detecting the occurrence of the change in the angle.

In the method of operating an electronic device according to various example embodiments, the controlling the touch controller may include changing the sampling rate of the touch controller based on a period in which a sensor for detecting an angle between the first housing and the second housing detects the angle.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated with reference to various example embodiments, it will be understood that the various example embodiments are intended to be illustrative, not limiting. One of ordinary skill in the art will understand that various changes in form and details may be made without departing from the spirit and scope of the disclosure, as set forth, for example, in the appended claims and equivalents.

What is claimed is:

1. An electronic device comprising:
a first housing;
a second housing;
a display, comprising a touch controller;
a memory storing instructions; and
at least one processor configured to:
receive, from the touch controller, a touch event produced based on an input on the display while an angle between the first housing and the second housing is being changed;
execute an operation corresponding to the received touch event; and
based on an amount of change in the angle being more than a predetermined value while the touch event is maintained on the display, cancel the execution of the operation corresponding to the received touch event.

2. The electronic device of claim 1, wherein at least one processor is configured to:
execute the operation corresponding to the received touch event after the change in the angle is terminated.

3. The electronic device of claim 1, further comprising:
a sensor configured to sense an angle between the first housing and the second housing, and
wherein at least one processor is configured to control the sensor to transmit an angle event for the change in the angle to at least one processor or to the touch controller.

4. The electronic device of claim 1, wherein at least one processor is configured to:
identify that the electronic device is being folded based on the amount of change in the angle between the first housing and the second housing.

5. The electronic device of claim 4, wherein at least one processor is configured to:
identify that the electronic device is being folded in response to identifying that the amount of change in the angle is more than a threshold value.

6. The electronic device of claim 1, wherein the executed operation is maintained if the amount of change in of the angle is less than the predetermined value.

7. The electronic device of claim 1, wherein at least one processor is configured to:
cancel, by a first manager, the execution of the operation corresponding to the received touch event by transmitting, by a second manager, a command for canceling the operation to the first manager.

8. A method of operating an electronic device, the method comprising:
receiving a touch event produced based on an input on a display of the electronic device while an angle between a first housing of the electronic device and a second housing of the electronic device is being changed;
executing an operation corresponding to the received touch event; and
if an amount of change in the angle is more than a predetermined value while the touch event is maintained on the display of the electronic device, cancelling the execution of the operation corresponding to the received touch event.

9. The method of claim 8, further comprising:
executing the operation corresponding to the received touch event after the change in the angle is terminated.

10. The method of claim 8, further comprising:
identifying that the electronic device is being folded based on the amount of change in the angle between the first housing and the second housing.

11. The method of claim 10, further comprising:
identifying that the electronic device is being folded in response to identifying that the amount of change in the angle is more than a threshold value.

12. An electronic device comprising:
a first housing comprising a first surface and a second surface;
a second housing comprising a third surface and a fourth surface;
a display disposed on the first housing and the second housing;
a touch controller;
a sub display disposed on the fourth surface of the second housing and the display disposed across the first surface of the first housing and the third surface of the second housing;
a memory storing instructions; and
at least one processor configured to:
receive, from the touch controller, a touch event produced based on at least one contact corresponding to the first surface and/or the third surface, with respect to the display while an angle between the first housing and the second housing is being changed;
execute an operation corresponding to the received touch event; and
based on an amount of change in the angle being more than a predetermined value while the touch event is maintained on the display, cancel the operation that is being executed.

13. The electronic device of claim 12, wherein at least one processor is configured to:
execute the operation corresponding to the received touch event after the change in the angle is terminated.

14. The electronic device of claim 12, wherein at least one processor is configured to:
identify that the electronic device is being folded based on the amount of change in the angle.

15. The electronic device of claim 12, wherein at least one processor is configured to:
identify that the electronic device is being folded in response to identifying that the amount of change in the angle is more than a threshold value.

16. The electronic device of claim 12, wherein the executed operation is maintained if the change in the angle is less than the predetermined value.

17. The electronic device of claim 12, wherein at least one processor is configured to:
cancel, by a first manager, the execution of the operation that is being executed by transmitting, by a second manager, a command for canceling the operation to the first manager.

18. An electronic device comprising:
a first housing;
a second housing;

a display, comprising a touch controller, disposed on a front surface of the electronic device and in a space formed by the first housing and the second housing;

a memory storing instructions; and at least one processor configured to:
- detect, by a first manager, an occurrence of an event of changing an angle between the first housing and the second housing by receiving, from a second manager, information on the angle between the first housing and the second housing;
- receive, by the touch controller, a touch event produced according to an input on the display while the angle between the first housing and the second housing is being changed;
- execute an operation corresponding to the touch event;
- receive, by a third manager, a command for canceling the operation based on an amount of change in the angle being more than a predetermined value within a predetermined time after receiving the input; and
- cancel, by the third manager, the operation corresponding to the touch event.

19. The electronic device of claim 18, wherein the executed operation is maintained if the change in the angle is less than the predetermined value.

* * * * *